United States Patent
Simunovic et al.

(10) Patent No.: US 7,213,967 B2
(45) Date of Patent: May 8, 2007

(54) METHOD AND SYSTEM FOR CONSERVATIVE EVALUATION, VALIDATION AND MONITORING OF THERMAL PROCESSING

(75) Inventors: Josip Simunovic, Raleigh, NC (US); Kenneth R. Swartzel, Raleigh, NC (US); Eric Adles, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 11/301,933

(22) Filed: Dec. 13, 2005

(65) Prior Publication Data

US 2006/0133449 A1 Jun. 22, 2006

Related U.S. Application Data

(63) Continuation of application No. 10/855,118, filed on May 27, 2004, now Pat. No. 7,004,620, which is a continuation of application No. 09/804,366, filed on Mar. 12, 2001, now Pat. No. 6,776,523.

(60) Provisional application No. 60/188,526, filed on Mar. 10, 2000.

(51) Int. Cl.
*A23L 3/005* (2006.01)
*A23L 1/00* (2006.01)
*C01K 3/04* (2006.01)
*C01K 7/02* (2006.01)

(52) U.S. Cl. .................. 374/102; 374/104; 374/163; 374/176; 374/141; 99/342

(58) Field of Classification Search ............... 374/141, 374/102, 103, 104, 208
See application file for complete search history.

(56) References Cited

U.S. PATENT DOCUMENTS

| | | | |
|---|---|---|---|
| 2,631,242 A | | 3/1953 | Metcalf |
| 3,242,733 A | * | 3/1966 | Johnson ................ 374/102 |
| 3,631,720 A | | 1/1972 | Weinstein et al. |
| 3,645,804 A | * | 2/1972 | Ponchel ................ 148/502 |
| 3,688,295 A | | 8/1972 | Tsoras et al. |
| 3,836,827 A | | 9/1974 | Cuthbertson |
| 3,965,741 A | * | 6/1976 | Wachtell et al. ........... 374/102 |

(Continued)

FOREIGN PATENT DOCUMENTS

JP 57079415 A 5/1982

OTHER PUBLICATIONS

Boll, R. et al., "Magnetic Sensors of New Materials", *Siemens Forschungs-Und Entwicklungsberichte*, vol. 10, No. 2, pp. 83-90, 1981.

(Continued)

*Primary Examiner*—Gail Verbitsky
(74) *Attorney, Agent, or Firm*—Jenkins, Wilson, Taylor & Hunt, P.A.

(57) ABSTRACT

A method of generating a temperature measurement for a batch or a continuous stream of material. The method includes providing a particle having a signal that changes at a pre-determined temperature; inserting the particle into the batch or continuous stream; and detecting a signal change from the particle to thereby generate a temperature measurement for the batch or continuous stream. A suitable system for use in carrying out the method is also described.

35 Claims, 12 Drawing Sheets

U.S. PATENT DOCUMENTS

| | | | |
|---|---|---|---|
| 4,437,882 A | | 3/1984 | Umemura et al. |
| 4,565,455 A | | 1/1986 | Bloore et al. |
| 4,576,781 A | | 3/1986 | Duncombe et al. |
| 4,643,588 A | | 2/1987 | Postle et al. |
| 4,859,360 A | * | 8/1989 | Suzuki et al. ............ 252/299.7 |
| 5,021,981 A | * | 6/1991 | Swartzel et al. ............ 702/136 |
| 5,158,364 A | * | 10/1992 | Labes ........................ 374/106 |
| 5,159,564 A | * | 10/1992 | Swartzel et al. ............ 702/136 |
| 5,425,819 A | | 6/1995 | Oohashi et al. |
| 5,476,792 A | * | 12/1995 | Ezrielev et al. ................ 436/1 |
| 5,493,100 A | | 2/1996 | Renger |
| 5,722,317 A | * | 3/1998 | Ghiron et al. ................ 99/452 |
| 5,801,630 A | | 9/1998 | Ho et al. |
| 5,932,813 A | | 8/1999 | Swartzel et al. |
| 6,015,231 A | * | 1/2000 | Swartzel et al. ............ 374/102 |
| 6,042,264 A | * | 3/2000 | Prusik et al. ............... 374/106 |
| 6,103,351 A | * | 8/2000 | Ram et al. ............... 428/195.1 |
| 6,514,462 B1 | * | 2/2003 | Simons ................... 422/82.12 |
| 6,556,947 B1 | | 4/2003 | Scheiner et al. |
| 6,614,728 B2 | * | 9/2003 | Spevacek .................... 368/327 |
| 6,766,699 B2 | * | 7/2004 | Swartzel et al. ......... 73/861.05 |
| 6,776,523 B2 | | 8/2004 | Swartzel et al. |
| 2002/0113066 A1 | | 8/2002 | Stark et al. |

OTHER PUBLICATIONS

Tucker et al., "Determination of Residence Time Distribution of Food Particles in Viscous Food Carrier Fluids Using Hall Effect Sensors," Technical Memorandum No. 667, The Campden Food and Drink Research Association, p. 1-43, (Dec. 1992).

Tucker et al., "Residence Time Distributio:: and Flow Behavior of Foods Containing Particles in Aspetic Processing," AIChemE Conference of Food Engineering, p. 1-12 (Feb. 1993).

"GMR Sensor Application Notes," Nonvolatile Electronics, Inc. Sensor Engineering and Application Notes, p. 1-31, (Oct. 7, 1996).

Sandeep et al., "Determination of Lethality During Aseptic Processing of Particulate Foods," *Institute of Chemical Engineers* (Trans IchemE 77, Par C: 11-17 (Mar. 1999).

Letter and Memo from Mexican patent attorney summarizing Official Action in related Mexican Patent Appl. No. PA/a/2002/008835 dated Sep. 30, 2004.

Australian Search Report for corresponding Australian Appl. No. 2001247375 dated Nov. 18, 2004.

Memo Concerning the Official Action Reported in the Covering Letter for Mexican Patent Appln. No. PA/a/2002/008835 dated Sep. 29, 2005.

Canadian Office Communication corresponding to the Canadian Patent Application No. 2,402,648 dated Nov. 23, 2006.

* cited by examiner

METHOD AND SYSTEM FOR CONSERVATIVE EVALUATION, VALIDATION AND MONITORING OF THERMAL PROCESSING

CROSS REFERENCE TO RELATED APPLICATIONS

This application is a continuation of U.S. patent application Ser. No. 10/855,118, filed May 27, 2004, now U.S. Pat. No. 7,004,620, incorporated herein by reference in its entirety, which is a continuation of U.S. patent application Ser. No. 09/804,366, filed Mar. 12, 2001, now U.S. Pat. No. 6,776,523, incorporated herein by reference in its entirety, which is based on and claims priority to U.S. provisional patent application Ser. No. 60/188,526, filed Mar. 10, 2000, herein incorporated by reference in its entirety.

GOVERNMENT SUPPORT

This work was supported by the National Science Foundation (NSF) pursuant to contract number MCB 9631375. The U.S. Government has certain rights in the invention.

TECHNICAL FIELD

The present invention relates generally to thermal processing of materials, and more particular to a method and system for generating temperature measurements for such processing, and to a detectable particle for use in such a method and system.

BACKGROUND ART

It will be appreciated by those having ordinary skill in the art that thermal processing of particulate-containing food products is difficult to accomplish in an efficient but effective manner. Particulate-containing food products are also described in the art as multi-phase food products, or as multi-phase foods, in that these products include liquids and solids.

Traditionally, thermal processing of particulate-containing food products involved the placing of the product in individual cans, followed by thermal treatment of the product within the can. The process is generally effective in removing microbial contamination and in providing a food product that is safe for consumption. However, this process is labor and machinery-intensive and time-consuming. Thus, this process lacks efficiency.

Continuous thermal processing generally involves the thermal processing of the food product as a stream or flow in one line while processing the containers or cans in which the food will be stored in another line. The food product is then placed in the container under appropriate conditions wherein microbes and their spores are excluded. Continuous thermal processing thus enables unlimited package size, yielding increased efficiencies and reduced costs to the industry and ultimately to the consumer. Continuous thermal processing is sometimes also called aseptic processing in the art.

In the United States each continuous thermal process for use in the treatment of food must be described in a document to be filed with the United States Food and Drug Administration (FDA) for approval before it can be implemented in industry. Because of the problems associated with uniform treatment in the continuous thermal process, the FDA subjects these documents, hereinafter referred to as "FDA process filings", "process filings" or "FDA filings", to rigorous scrutiny.

To gain FDA approval, a process filing must demonstrate biovalidation of the process, among other information. As is known in the art, biovalidation refers to data showing that the process was effective in removing contamination of the food product by microbes and their spores. To determine biovalidation, conservative residence time distribution measurements are required. Lengthy test runs must be performed to generate the conservative residence time distribution measurements. Such test runs require a great deal of time and involve the loss of a great deal of the food product, as the food product that is part of the test run cannot be salvaged. The time required for and food product lost in such test runs have prevented the wide scale adoption in the industry of continuous thermal processing of particulate-containing food products.

The current state of the art for process evaluation and validation of continuous thermal processes for particulate-containing food particles, including low acid multi-phase foods, has evolved over a number of years through the joint efforts of the Center for Advanced Processing and Packaging Studies and the National Center for Food Safety and Technology. Currently, it consists of a three (3)-stage sequence. The first stage of the sequence primarily includes process modeling and simulation that provides predicted scenarios for the efficacy of process with respect to microbial lethality. The second stage of the sequence includes experimental measurements of real or simulated particle residence times while flowing through the system for a sufficient number of replications for each particulate product component to provide statistically acceptable (i.e. representative) data for particle velocities to ensure that a portion of the fastest moving particles has been captured and their residence times recorded for modeling purposes. The third and final stage of process evaluation and validation is a biological validation consisting of the use of thermoresistant bacterial spore loads within simulated food particles to demonstrate the achievement of appropriate cumulative thermal time and temperature by the implemented process—sufficient to lethally injure all bacterial spores present within the test particles.

Procedures disclosed in the art attempt to implement these stages by using various methods of particle residence time measurement. For example, U.S. Pat. No. 5,261,282 to Grabowski et al. discloses the use of implanted radio frequency transponders to identify simulated particles passing through a continuous process system. U.S. Pat. No. 5,741,979 to Arndt et al. discloses the use of dipole antenna marker implants in the particles and microwave transducer detectors to measure particle residence times.

Segner et al., "Biological Evaluation of a Heat Transfer Simulation for Sterilizing Low-Acid Large Particulate Foods for Thermal Packaging", Journal of Food Processing and Preservation, 13:257–274, (1989); Tucker, G. S. and Withers, P. M., "Determination of Residence Time Distribution of Food Particles in Viscous Food Carrier Fluids using Hall effect sensors", Technical Memorandum 667, Campden Food and Drink Research Association (CFDRA), Campden, Glos., U.K. (1992); "Case Study for Condensed Cream of Potato Soup", Aseptic Processing of Multi-phase Foods Workshop, Nov. 14–15, 1995 and Mar. 12–13, 1996 (published 1997); U.S. Pat. No. 5,750,907 to Botos et al.; U.S. Pat. No. 5,739,437 to Sizer et al.; and U.S. Pat. No. 5,876,771 to Sizer et al. all disclose the use of permanent magnets for implants (single tag type) and a variety of magnetic field sensors to detect and record their passage through several system segments and locations.

The necessity for measurements of particle residence time and subsequent biological process validation using bacterial spores is a result of the current inability to measure temperature in the "cold spot" (the slowest heating point within a particle) of the fastest moving, slowest heating particle present in the continuously thermally processed multiphase product. Several techniques have been proposed in the art for this purpose and can be grouped into two groups: techniques implementing cross sectional imaging/tomography of the entire flow profile and techniques implementing thermosensitive implants in specific particle locations.

Magnetic resonance imaging thermometry, such as that disclosed by Litchfield et al., "Mapping Food Temperature with Magnetic Resonance Imaging", National Research Initiative Competitive Grant Program, Cooperative State Research, Education, and Extension Service, United States Department of Agriculture. (March 1998), is a non-obstructing and non-contact method, but is not rapid enough to provide in-line real time measurements. It took eight seconds to image a single 64×64 cross-sectional temperature map. During this time a considerable quantity of product would pass the detector unmonitored. It is also extremely complex and cumbersome for these types of measurements, requiring complicated technology, highly trained personnel, and specialized power and power conditioning. Due to all these factors, the number of windows/cross sections that can be observed and monitored within the process equipment is very limited, i.e. the detection of the initial location where the lethal thermal treatment temperature is achieved cannot be determined for all possible cases. The applicability of detection through stainless steel equipment walls without special ports or windows is unclear.

Similar shortcomings are evident with the other tomographic/cross sectional imaging techniques implementing ultrasonic tomography and tomographic reconstruction, such as that disclosed in U.S. Pat. No. 5,181,778 to Beller. Particularly, due to system complexity, the number of observed cross sections is limited. Another problem with the Beller system is the potential for misidentifying the thermal profiles occurring within or outside of the particle. For example, Beller discloses that the curve of the speed of sound versus temperature for potatoes approximately paralleled that of water above about 110° C. This indicates a potential material and location misidentification of fluid vs. solid temperatures. Additionally, standardization and calibration curves must be generated for each and every potential product component, necessitating a very laborious and lengthy measurement and calibration procedure prior to implementation. The applicability of detection through stainless-steel equipment walls without special ports or windows is also unclear.

Methodologies that implement thermosensitive implants include the local magnetic temperature measurement approach disclosed in U.S. Pat. No. 5,722,317 to Ghiron et al. Ghiron et al. disclose the use of spherical paramagnetic particles for implants and detector coils around the pipes for sensors. The approach then implements the correlation between the falling magnetic field strength and temperature increase to calculate the implant temperature from the signals of three sensor coils. However, the negative correlation between the measured magnetic field and the increasing temperature employed by the Ghiron et al. approach can cause a non-conservative temperature estimation, i.e. the resulting calculation can indicate a higher temperature than is actually present in the implant. This is due to the fact that magnetic field reduction can be caused by a variety of factors other than temperature increase in the implant, such as the particle or the detection system being out of calibration, reduction of sensitivity of the detection system, and obstruction of detection by other materials such as other present food particles. The complexity of the system disclosed by Ghiron et al. also limits the number of observation points as well as the applicability at high-temperature, short time processing levels.

The Campden and Chorleywood Food Research Association in Great Britain reports on the use of a Temperature Responsive Inductance Particle (TRIP) sensor, which can be placed in the food product. The time temperature history of the sensor is purportedly monitored/logged in real time outside the processing equipment/environments. See Research Summary Sheets, 1997–68, "TRIP—A New Approach to the Measurement of Time and Temperature in Food Processing Systems". Most of the details of this methodology are not publicly available. However, one of the accessible, limited reports indicates that the sensor size is about 5 mm in diameter. This size precludes its use to measure the "cold spot" temperatures in aseptically processed particles. Additionally, no disclosure is made with respect to capability for the monitoring through stainless steel equipment and current applicability to continuous processes.

One common shortcoming of all available systems is the limited number of monitoring locations due to the complexity, cost or the necessity of having view ports or windows within the stainless steel processing equipment segments. This is a serious disadvantage due to the fact that various product components, and especially product formulations, achieve thermally lethal temperature levels within particles at various points in the equipment stream path. It is not therefore sufficient to have a port or a detector located at any specific fixed location along the process stream path. While this port might detect lethal levels for one product or particle type, it would have to be repositioned or added downstream to ensure confirmation of lethal temperature levels for a faster moving or slower heating particle type or product. The location point for a downstream detection unit, port or window might be arrived at by modeling, but is substantially impossible to predict reliably without actual experimental data. This requirement therefore becomes an uncertain, expensive, multi-step trial and error procedure for each processed particle type and product formulation.

Currently, there are no available continuous process particle temperature measurement systems, conservative or otherwise, in spite of the documented need by the industry as well as the above-noted several attempts to provide an appropriate method and system. Thus, what is needed is a method and system that can conservatively generate temperature measurements in continuous thermal processing of particulate-containing food products, among other applications. Such a method and system are lacking in the prior art.

SUMMARY OF THE INVENTION

A method of generating a temperature measurement for a batch or a continuous stream of material is disclosed. The method comprises: providing a particle having a signal that changes at a pre-determined temperature; inserting the particle into the batch or continuous stream; and detecting a signal change from the particle to thereby generate a temperature measurement for the batch or continuous stream.

A system suitable for carrying out the method is also disclosed. In a preferred embodiment, the system comprises:

a particle having a signal that changes at a pre-determined temperature; and a detector for detecting a signal change from the particle to thereby generate a temperature measurement for the batch or continuous stream.

Accordingly, it is an object of this invention to provide a novel method and system for generating a temperature measurement for a batch or continuous stream of material. The object is achieved in whole or in part by the present invention.

An object of the invention having been stated hereinabove, other objects will become evident as the description proceeds when taken in connection with the accompanying Drawings and Examples as best described herein below.

DETAILED DESCRIPTION OF THE INVENTION

Temperature measurements for the continuously flowing particles in a thermal multi-phase processing system need to be performed in such a way that will not obstruct or impede the stream of continuously moving product within the system. If the stream of the observed targets needs to be impeded, slowed down or stopped to implement the measurement, this will generally result in non-conservative measurement and therefore non-conservative process evaluation.

Figure 17:
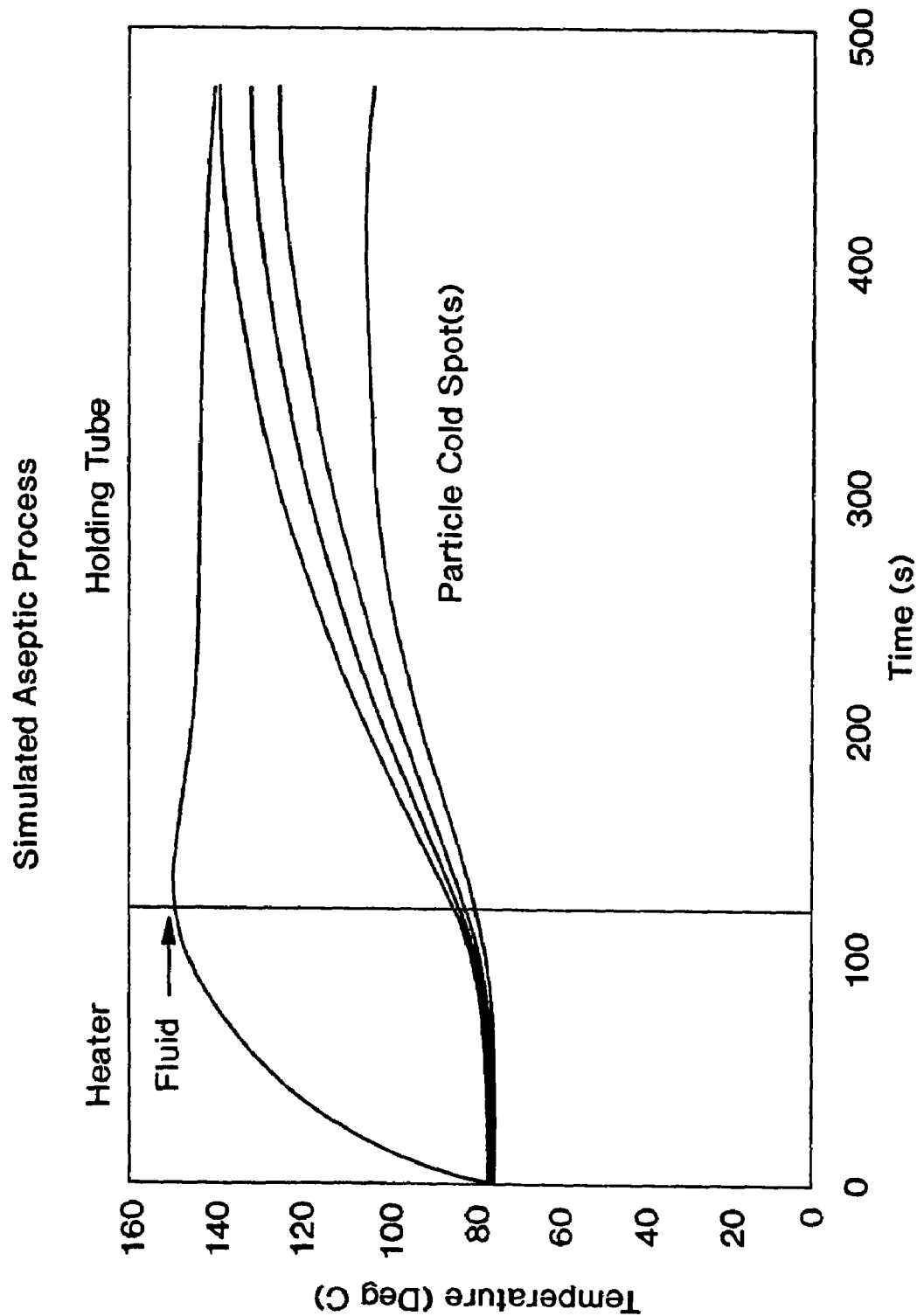
FIG. 17 is a graph depicting a time and temperature profile for particles in a simulated aseptic process.

Temperature measurements therefore need to be performed using non-obstructing, non-contact measurement techniques and using a sufficiently rapid response and detection to enable recording of the temperature in full stream and in real time. The detection system should also preferably be functional through the existing stainless steel equipment without major modifications to the geometry or material structures. Finally, a suitable temperature measurement method and system should measure temperature in the "cold spot" of the fastest moving, slowest heating particle present in the continuously thermally processed multi-phase product. The need for such characteristics in a detection system and method is further illustrated in FIGS. 9 and 17, which are graphs depicting a time and temperature profile for particles in a simulated aseptic process. A method and system for generating temperature measurements having the characteristics discussed immediately above are provided in accordance with the present invention.

Particularly, the present invention provides a method and system that can conservatively generate temperature measurements in batch and in continuous thermal processing of particulate-containing food products, among other applications. In a preferred embodiment, the method and system of the present invention implement a large number of inexpensive, robust, thermally stable sensors adjusted to cover and monitor the entire length of a process hold tube and reliably ensure the detection of the time and place of target temperature achievement, regardless of its location along the tube length. Thus, a conservative temperature measurement is assured for all processed products and particle types without complicated system modifications. Optionally, the number (and thus system sensitivity) and density of sensors can be increased at specific path areas of interest to enable more precise location and measurement.

While treatment of food products is a preferred application of the novel method and system of the present invention, other representative applications include other types of thermal treatment, such as enzymatic inactivation, thermal inactivation or destruction of other harmful components (viruses, toxins, carcinogens, mutagens and contaminants); thermal or catalytic process enhancement; and thermal treatments of various materials required to achieve either a minimum temperature or a minimum time-temperature process combination. The present invention thus pertains to a temperature measurement method and system that provide conservative measurement with respect to a variety of particles, such as real food particles with no characteristic compensation or adjustment, non-food biomaterial particles; and organic and inorganic thermally treated particles, whether natural or fabricated.

Conservative temperature measurement is defined for the purposes of this invention as a measurement that provides temperature detection only when a selected minimum temperature is reached by the observed target and maintaining the temperature detection signal only when the observed target is at or above such selected temperature level. Conservative temperature measurement is of particular importance in thermal microbicidal treatments such as pasteurization and sterilization since it provides a tool to assure that the minimal required cumulative microbicidal thermal process has been received by the observed target. Correspondingly, then, a conservative temperature evaluation method in accordance with the present invention is a method that assures detection and recording of all temperatures exceeding a preselected or predetermined temperature level.

In a preferred embodiment, the present invention pertains to a novel method for process evaluation, validation and monitoring for continuous thermal food processing systems, equipment and products. The method is more preferably applied to continuous thermal processing of food products containing both fluid and particulate components, also known as multi-phase products. The method can be used for any level of heat treatment, including mild treatments for enzyme inactivation; low, intermediate and high pasteurization treatments; and high temperature short time and ultra high temperature (also known as aseptic) thermal processing treatments yielding shelf stable products.

The method can be used for both simple (single type of solid/particulate component/ingredient) and complex (multiple and varying types of solid/particulate components/ingredients) multi-phase products, such as soups, stews, particulate-containing sauces, spreads, chunked meats, and the like. The method is also applicable to both high acid and low acid foods, but has specific advantages in the processing of low-acid, shelf stable multi-phase food products by providing functionality and analytical capability heretofore unavailable in the art.

Following long-standing patent law convention, the terms "a" and "an" mean "one or more" when used in this application, including the claims.

I. Methods of the Present Invention

A method of generating a temperature measurement for a batch or a continuous stream of material is disclosed. The method comprises: providing a particle having a signal that changes at a predetermined temperature; inserting the particle into the batch or continuous stream; and detecting a signal change from the particle to thereby generate a temperature measurement for the batch or continuous stream.

Preferably, the particle further comprises an implant surrounded by a shield material and the predetermined temperature further comprises a temperature at which the shield material no longer shields the implant. Thus, the detectable particles used in the method and system are also an aspect of this invention. By the term "detectable particle" it is meant a particle that includes an implant that is detectable by sensors used in the method and system. The implant is inserted within, attached to, or otherwise integrated into the particle.

In a preferred embodiment, the particle further comprises a magnetic implant surrounded by a ferromagnetic material and the predetermined temperature further comprises a Curie temperature for the ferromagnetic material. Optionally, the magnetic implant comprises a material selected from the group consisting of neodymium iron boron, cobalt rare earth (e.g. samarium-cobalt), aluminum-based (e.g. aluminum-nickel), ceramic, organic, plastic-embedded metal or ceramic and combinations thereof. The concept of a Curie transition temperature is well known, and is described by in numerous patents, including U.S. Pat. Nos. 3,836,827; 5,811,894; 4,576,781; Japanese Patent Publication No. JP58033137A; and Japanese Patent Publication No. JP5809523A, the entire contents of each of which herein incorporated by reference.

Preferably, the magnetic thermo-detecting implant comprises a small (e.g. about 3.5 mm or less) and light (e.g. about 0.35 grams or less) pre-magnetized permanent magnet with maximum operating and Curie temperatures higher than any temperature achieved during thermal processing. This pre-magnetized permanent magnet also has a Curie temperature characteristic higher than a second element of the particle: a non-magnetized ferromagnetic powder or layer (e.g. chromium dioxide, fired ferrite, garnet or other suitable magnetic-field shielding material) completely surrounding the permanent magnet from all sides. The non-magnetized shield material is selected based on its Curie temperature characteristic, which is the desired temperature level to be conservatively measured. Commercial sources of suitable powders include Powder Tech Corporation of Valparaiso, Ind. and Trans Tech, Incorporated of Adamstown, Md. Table 1 provides representative commercially available powders and their corresponding Curie temperatures.

TABLE 1

Representative Shield Materials

| Commercial Source | Part No. | Curie Temperature (° C.) |
|---|---|---|
| Powder Tech Corporation | FP 95 | 95 |
| Powder Tech Corporation | FP 110 | 110 |
| Powder Tech Corporation | FP 140 | 140 |
| Powder Tech Corporation | FP 150 | 150 |
| Powder Tech Corporation | FP 160 | 160 |
| Trans Tech, Incorporated | G-350 (55) | 130 |
| Trans Tech, Incorporated | G-400 (216-1) | 135 |
| Trans Tech, Incorporated | G-475 (21) | 140 |
| Trans Tech, Incorporated | G-510 | 155 |
| Trans Tech, Incorporated | TT1-414 | 90 |
| Trans Tech, Incorporated | TT1-1000 | 100 |
| Trans Tech, Incorporated | TT1-09 | 140 |
| Trans Tech, Incorporated | TT2-113 | 120 |

The above-described particle construction ensures the conservative temperature-monitoring functionality of the implant. That is, with a proper selection of both permanent magnet and non-magnetized surrounding shield material, the magnetic field of the implant/shield material will have a certain (e.g. low or net zero) magnitude until the implant reaches the predetermined monitored temperature level. At this temperature level, i.e. the pre-selected or predetermined temperature which corresponds to the Curie temperature of the shielding material, the shielding material will lose it ferromagnetic (and thus magnetic-field shielding) characteristics and the net magnetic field strength of the implant approaches the field strength of the permanent magnet in the center. This signal change is detected in accordance with the present invention. The signal or field strength remains "switched-on" as long as the temperature of the particle remains at or above the predetermined temperature.

The alternatively "switched-off" and "switched-on" characteristic of the combined magnetic field of the implant/shield material in the particle enables the detection of the particle by magnetic field sensors installed proximate to the batch or continuous stream, e.g. around the processing equipment. A copper coil sensor is one suitable example. Copper coil sensors have medium sensitivity and are based on magnetic flux change. A minimum particle velocity is required for detection. Hall effect sensors are also acceptable, as the sensors are medium/high sensitivity and can detect changes in magnetic flux under temperature conditions up to 110° C. Another suitable sensor is a magneto-inductive sensor, such as are commercially available from Precision Navigation, Incorporated of Santa Rosa, Calif.

However, the preferred magnetic sensor relies on the giant magneto-resistive (GMR) phenomenon. This effect is found in metallic thin films comprising magnetic layers a few nanometers thick separated by equally thin non-magnetic layers. A large decrease in the resistance of these films is observed when a magnetic field is applied. Thus, magnetic sensors including GMR materials can be used to detect the magnetic fields present in the particles. The GMR sensor is very sensitive and can operate at temperatures ranging up to at least 150° C. It is also inexpensive and very small. See GMR Sensor Application Notes, available from Nonvolatile Electronics, Incorporated (NVE), 11409 Valley View Road, Eden Prairie, Minn. 55344-3617.

The low (switched-off) magnetic field state can be used to monitor the location and residence time of the particle prior to achieving the predetermined (switch-on) temperature as well as later in the cooling part of the process when its temperature falls below the predetermined temperature. The achievement of the high (switched-on) temperature by the implant/shield material is detected by the magnetic field sensors and used to identify and monitor the precise location, length and time spent by the implant/shield material in the thermal processing system, which is preferably positioned in the system "cold spot"—i.e. in the geometric center of the fastest-moving, slowest heating particle.

The particles employed in the method of the present invention are also preferably engineered so that their density is compensated to a predetermined level in accordance with techniques disclosed in U.S. Pat. Nos. 5,932,813 and 6,015,231 both to Swartzel et al., and each of which is herein incorporated by reference in its entirety. Thus, the particles have characteristics needed for conservative evaluation of thermal treatment: conservative (fast) flow behavior and conservative (slow) heat transfer characteristics within the particle. The particles can be of uniform wall thickness, size and shape, or can vary in wall thickness, size or shape. The objective is to provide a detectable particle having the size and/or density to provide a conservative residence time measurement as compared to the food particle (i.e., potato, beef cube, etc.) of interest, while containing a sufficient level of implant/shield material loading to enable reliable entry and exit detection under realistic processing conditions. By "conservative residence time measurement", it is meant that residence time measurement with the highest likelihood of containing the fastest particle.

Thus, in a preferred embodiment, when it is said that the density of the particle is compensated to a predetermined or target level, it is meant that density which provides for a conservative residence time measurement. Further, choices for particle size, shape and density adjustment as presented herein are made with the objective of providing a conservative residence time measurement in mind.

Therefore, in accordance with the method of the present invention, conservative (minimal) time-temperature lethal treatment received by the particles can be identified and used to evaluate, validate and monitor thermal treatment of a material. In this case, sensors are optionally designed and tuned to detect magnetic signal levels within selective ranges so that one set of sensors (more sensitive) detects magnetic fields of particles with implants both in switched-off (below the predetermined temperature) and switched-on (at or above the predetermined temperature) states. A parallel set of sensors (less sensitive) is optionally designed, constructed and tuned to detect magnetic field strengths of particles with implants in the switched-on state (at or above the target temperature). Thus, the method of the present invention can be used in the measurement of both residence time and conservative temperatures using the same observation, acquisition and recording equipment.

The versatility of the method of the present invention is further demonstrated through the use of multiple values of predetermined conversion (switched-on) temperatures and related ferromagnetic material Curie temperatures, and multiple test particles for each of the individual selected temperatures. An additional parallel set of sensors (less sensitive) can optionally be designed, constructed and tuned to detect magnetic field strengths of a particle or set of particles with implants having a stronger signal when the implant reaches a higher predetermined temperature.

While the method of the present invention can be applied to thermal treatment of a batch of material, it is preferably applied to the thermal treatment of a continuous stream of material. More preferably, the signal change is detected continuously in real time over a predetermined length of the continuous stream. For example, the signal change can be detected via a plurality of successive, parallel and/or overlapping sensors, or combinations thereof, placed proximate to the continuous stream over the predetermined length of the continuous stream. Sensors are optionally designed and tuned to detect magnetic signal levels within selective ranges so that one set of sensors (more sensitive) detects magnetic fields of particles with implants both in switched-off (below the predetermined temperature) and switched-on (at or above the predetermined temperature) states. A parallel set of sensors (less sensitive) is optionally designed, constructed and tuned to detect magnetic field strengths of particles with implants in the switched-on state (at or above the target temperature). A plurality of particles, each having a different predetermined temperature for a signal change as described above, can also be used.

In an alternative embodiment of the method of the present invention, the particle comprises a luminescent implant surrounded by an opaque material and the predetermined temperature further comprises a melting temperature of the opaque material. Thus, an activated luminescent implant is preferably placed in the center of the particle and completely surrounded with opaque (e.g. black) coating material. The melting point temperature of the coating material is preselected to represent the "switched-on" conversion temperature (i.e. the "predetermined temperature") of the particle so that the luminescent signal can be detected. Thus, the implant remains opaque/black until the melting point of the surrounding material is reached. At this temperature and above it, the luminescent (light-emitting) characteristics of the implant become visible and detectable by an external sensors, such as light sensors, or such as single or multiple video cameras. The monitored predetermined length of the processing system should be transparent in this case, or transparent view-ports at appropriate locations.

An added functional advantage of this embodiment is the fact that the light color of the light-emitting implant segment can be selected to identify the predetermined "switched-on" temperature. Therefore, a green light in a particle, for example, can be used to indicate that the implant has reached a minimum of 130° C., a red light can be used to indicate 135° C., a blue light can be used to indicate 140° C., and so forth. Finally, since the melting-point detection is irreversible, the detected temperature remains conservative as long as the temperature of the surrounding carrier fluid is monitored and confirmed to be above the level indicated by the monitoring implant. Another functional advantage of this embodiment is that it is a non-metallic approach and thus can be used with electrical and electromagnetically treated products. Representative electrical and electromagnetically treatment approaches include ohmic (electrical resistance) heating, microwave heating, pulsed electric field and radiofrequency.

Preferred luminescent or light emitting materials include fluorescent, phosphorescent, and chemiluminescent materials. Representative fluorescent labeling compounds comprise dinitrophenyl, fluorescein and derivatives thereof (such as fluorescein isothiocyanate), rhodamine, derivatives of rhodamine (such as methylrhodamine and tetramethylrhodamine), phycoerythrin, phycocyanin, allophycocyanin, o-phthaldehyde and fluorescamine. Representative fluorescent dyes include Texas red, Rhodamine green, Oregon green, Cascade blue, phycoerythrin, CY3, CY5, CY2, CY7, coumarin, infrared 40, MR 200, and IRD 40. Representative chemiluminescent compounds comprise luminol, isoluminol, theromatic acridinium ester, imidazole, acridinium salt and oxalate ester, while representative bioluminescent compounds comprise luciferin, luciferase and aequorin. All of the compounds are available from commercial sources, such as Molecular Probes, Inc. of Eugene, Oreg. and Sigma Chemical Company of St. Louis, Mo.

Summarily, the novel method of the present invention assures real-time, on-line, non-contact detection of the time and place within the processing system where the centerpoint of a conservatively constructed simulated food particle reaches one of a number of pre-selected microbially or enzymatically active (lethal) temperatures. By monitoring the stream and the heat penetration into a single or into a plurality of simulated particles with pre-selected single-temperature range indicators, and by using multiple populations of such particles, each population designed, constructed and calibrated to a different temperature range, conservative process evaluation and validation can be achieved and documented in a simple, robust and reliable way. Therefore, in addition to conservative construction characteristics of the simulated particles (appropriate/critical density adjustment and conservative/low thermal conductivity) the present invention for the first time implements a conservative method for real-time, non-contact temperature detection of thermal-detection implants used within simulated or real particles in a batch of material or in material flowing as a continuous stream through a processing system.

By combining conservative temperature measurement with the conservative particle construction (ensuring conservative/fast stream and conservative/slow heat penetration) the present invention ensures that all components (slower moving and faster heating particles and fluids) processed in a thermal treatment system have received or exceeded at least the minimal cumulative thermal treatment recorded by the conservative temperature measurement for the conservatively constructed target. The long-standing prior art problem of establishing a conservative method to measure temperature in the "cold spot" of a conservatively designed and constructed particle is therefore met by the present invention.

II. System of the Present Invention

Figure 1A:
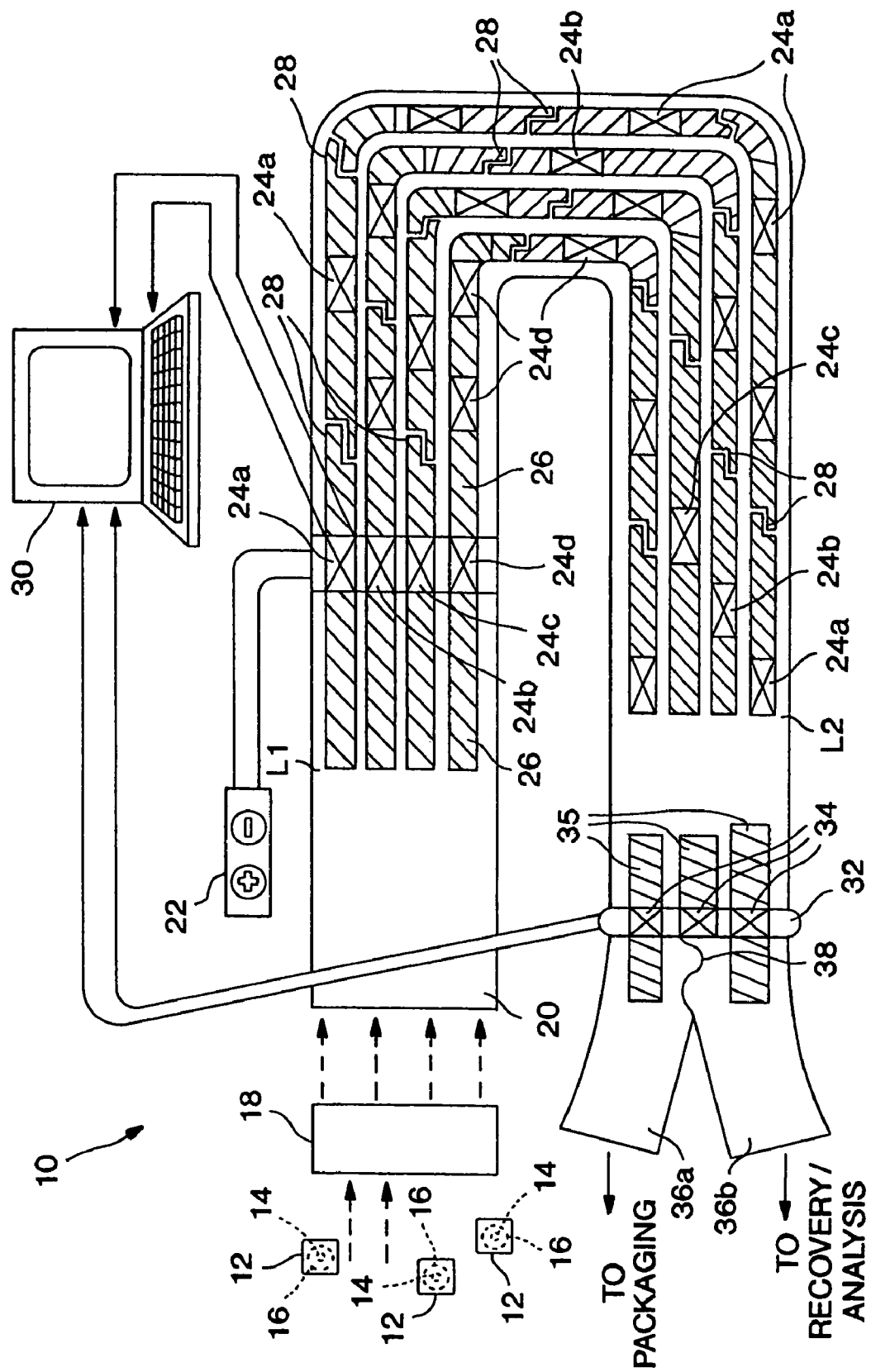
FIG. 1A is a schematic view of a first preferred embodiment of the system of the present invention when employed with a thermal processing apparatus.
Figure 1B:
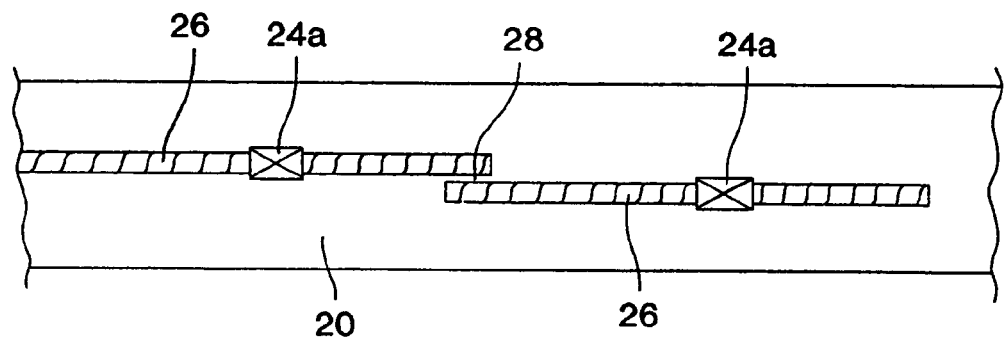
FIG. 1B is a schematic view of a section of a first preferred embodiment of the system of the present invention showing a preferred orientation of successive and overlapping sensors employed with a thermal processing apparatus.
Figure 1C:
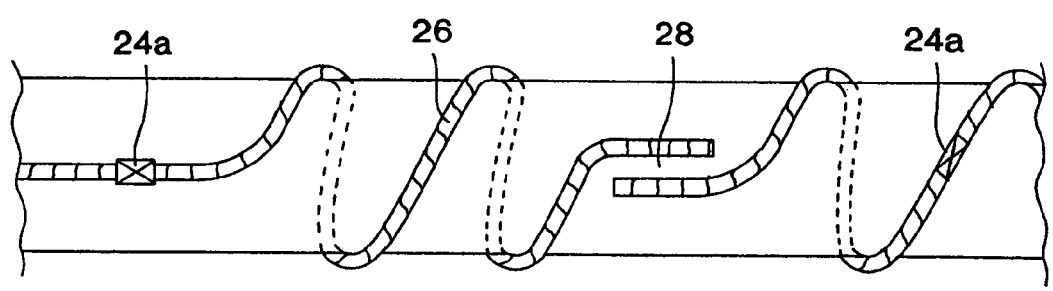
FIG. 1C is a schematic view of a section of a first preferred embodiment of the system of the present invention showing an alternative orientation of successive and overlapping sensors employed with a thermal processing apparatus.
Figure 1D:
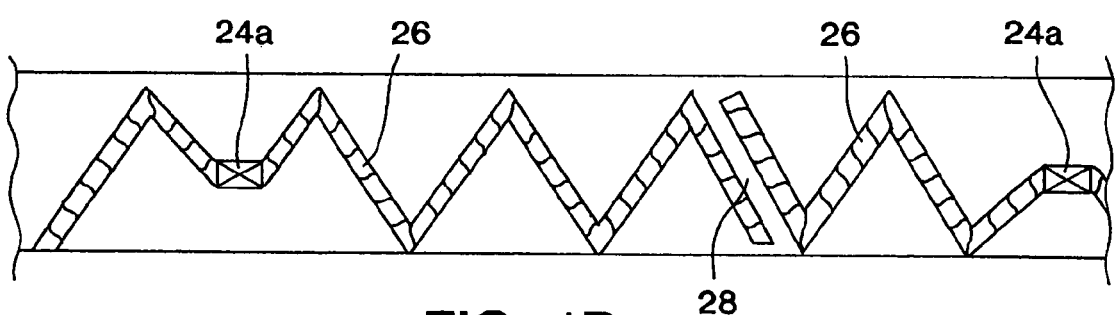
FIG. 1D is a schematic view of a section of a first preferred embodiment of the system of the present invention showing another alternative orientation of successive and overlapping sensors employed with a thermal processing apparatus.

Referring now to FIGS. 1A–6, wherein like reference numerals refer to like parts throughout, and particularly referring to FIG. 1A, the system of the present invention is generally referred to as 10. System 10 comprises particles 12, infeed hopper 18, pipe 20, sensors 24A, 24B, 24C and 24D, and computer acquisition system 30. Sensors 24A, 24B, 24C and 24D each further comprise optional flux-concentrating strips 26 and are mounted along a predetermined length of pipe 20, wherein the predetermined length is defined by points L1 and L2. Power source 22 provides power to sensors 24A, 24B, 24C and 24D.

Referring now to FIGS. 1A–1D, optional flux-concentrating strips 26 for sensors 24A, 24B, 24C and 24D are mounted in a parallel manner (FIGS. 1A and 1B) with the ends of optional flux-concentrating strips 26 in a parallel or side-by-side overlap as represented by overlap points 28. Alternatively, optional flux-concentrating strips 26 can be wrapped around pipe 20 (FIG. 1C), can be mounted in a "zig-zag" pattern on pipe 20 (FIG. 1D) or in any other suitable manner, with the ends of optional flux-concentrating strips 26 preferably oriented in a parallel or side-by-side overlap as represented by overlap points 28. As noted herein, flux-concentrating strips are optional, i.e. they are not always necessary or indeed, appropriate, in some installations.

Continuing with reference to FIG. 1A, particles 12 further comprise an implant 14 and shield material 16. Implant 14 provides a signal for particle 12; but, shield material 16 shields the signal from sensors 24A, 24B, and 24C until the interior, or "cold spot" of the particle reaches a predetermined temperature. In this case, the predetermined temperature with respect to each particle 12 depicted in FIG. 1A is different. Additionally, one of sensors 24A, 24B, and 24C can optionally be calibrated to detect a signal from particles 12 at a temperature below the predetermined temperature for the respective particles 12. Sensor 24D, with corresponding optional flux-concentrating material 26, is also provided and can be used for detection of particles 12 if desired.

Continuing with reference to FIG. 1A, when in use system 10 accommodates the insertion of particles 12 via infeed hopper 18 into pipe 20. Preferably, pipe 20 represents a continuous thermal processing apparatus such as that described in U.S. Pat. No. 5,261,282 to Grabowski et al., herein incorporated by reference. Particles 12 are carried by a continuous stream of material flowing within pipe 20 and are monitored for a signal change beginning at point L1. When the interior of particles 12 reach the respective predetermined temperatures (also referred to herein as a "switch temperature" or "temperature switch") for each particle 12, shield material 16 no longer cloaks the signal produced by implant 14 and the signal is detected by sensors 24A, 24B, or 24C. The signal is detected continuously by the appropriate sensors 24A, 24B, or 24C over a predetermined length of pipe 20 defined by points L1 and L2. Preferably, the predetermined length defined by points L1 and L2 comprises a length wherein a "cold spot" within particle 12 is maintained at or above the predetermined temperature for a sufficient time to accomplish desired thermal treatment of the product flowing in pipe 20. The detection of the signal along this predetermined length is recorded by computer acquisition system 30 for graphical display, for printout in a word processing report, or for other review and evaluation by a user. Computer acquisition system 30 thus represents a device for digital recording of output (e.g. signals from particles 12) for documentation storage, e.g. as computer data files, and subsequent retrieval and analysis purposes. Other such devices include digital cameras. Another representative such device includes a video camera, which can be employed for analog (video tape) recording for documentation storage and subsequent retrieval and analysis purposes. Another such device provides for video recording onto a VCR tape off the actual computer display signal, that is, without using a camera, but rather through a converter to a regular NTSC video. This converter can be built into a video card in computer acquistion system 30 or can be external. This converter allows recording onto a tape of anything that is displayed on the computer screen—meaning that as different signals at different locations of particles flowing through system 10 are observed, they can be recorded on the video tape. This can be done, for example, with magnetic particles and the corresponding peaks that are shown in FIGS. 10–17 and described in the Examples presented below. A still camera can also be employed at an appropriate shutter speed and other settings to record output, e.g. signals from particles 12. Video and still cameras can be operatively connected to system 10 for automated activation upon detection of a signal or other desired event, and are optionally employed in an embodiment of system 10 comprise a transparent pipe sections or a view-port.

Continuing with reference to FIG. 1A, and in the case of a particulate-containing food product flowing in pipe 20, particles 12 are detected by additional sensors 34, wherein sensors 34 further comprise optional flux-concentrating straps 35 and wherein sensors 34 are mounted within belt or gasket 32. Upon detection, the stream within pipe 20 is diverted via valve 38 through pipe section 36B for particle recovery and optional post process measurements and microbial plating. After the particles are diverted, valve 38 is then closed and the food product continues within pipe section 36A to be packaged. Thus, the application of the system 10 of the present invention to a production line for the thermal treatment and packaging of a particulate-containing food product becomes apparent.

Figure 2:
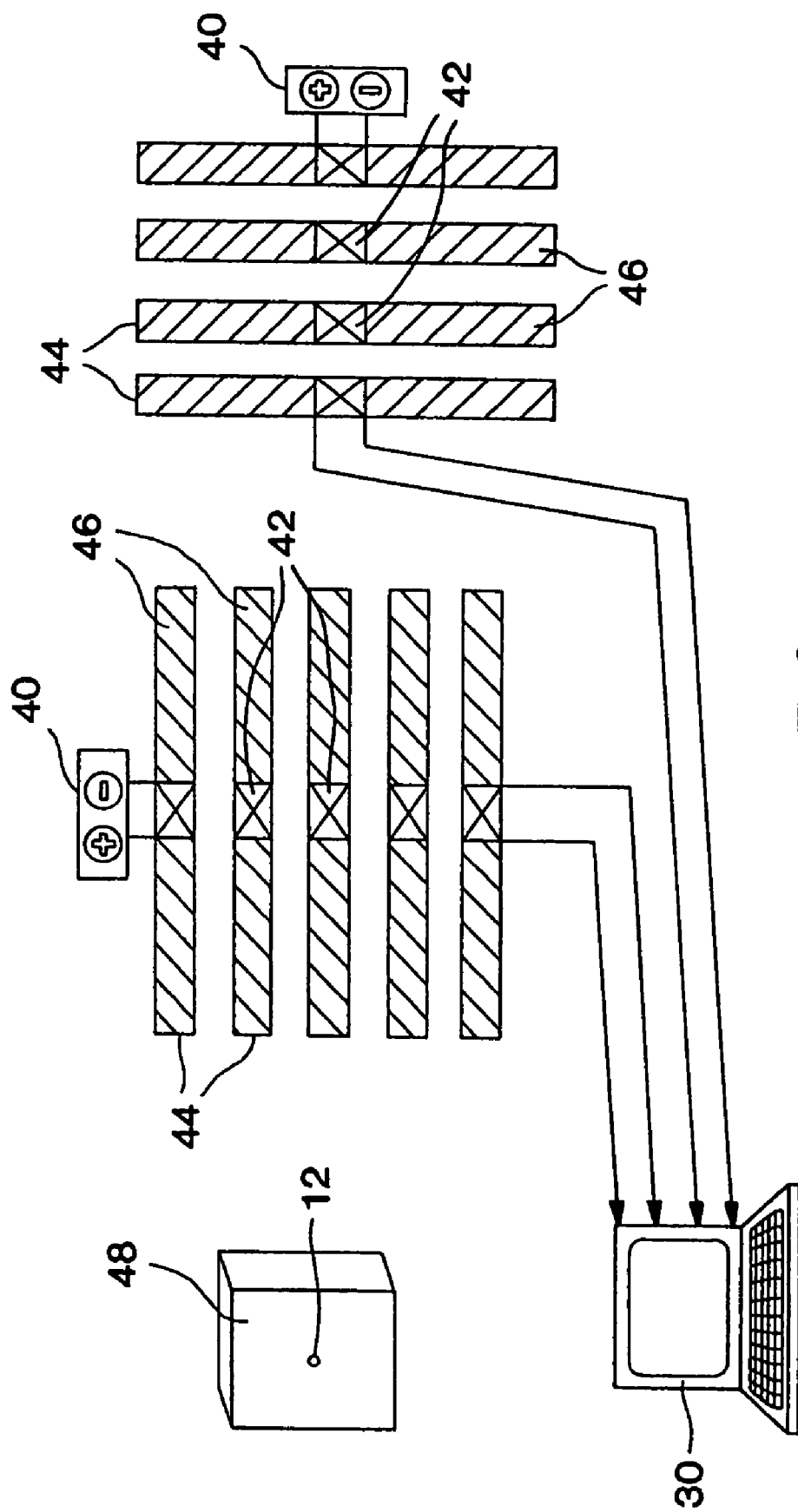
FIG. 2 is a schematic view of a second preferred embodiment of the system of the present invention pertaining to the detection of a particle of the present invention in a packaged food product.

Referring now to FIG. 2, an alternative configuration for detecting particles 12 after employing particles 12 in the treatment of a food product is depicted. In this configuration, a particle 12 is detected in a package after the food stream is run through a continuous thermal processing line and packaged. The package 48 containing the particle 12 is removed from the line.

Other packages that do not contain particles 12 then move along the line and assuming temperature measurements and/or other thermal treatment evaluations indicate sufficient thermal treatment, the packages can be sold to consumers. Thus, it is envisioned that the method and system of this invention can be used in generating thermal measurements, lethality calculations and other thermal history data during the continuous thermal processing of a food product that is to be sold to consumers. Stated differently, it is envisioned that the method and system of the present invention can be implemented under normal processing run conditions to evaluate thermal treatment as part of the regular quality control procedure for regular production runs, in addition to facilitating fulfillment of requirements for a process filing as required by the FDA.

Referring again to FIG. 2, packages 48 are moved along a conveyor belt (not shown in FIG. 2). Straps 44 including GMR sensors 42 and optional flux-concentrating material 46 are placed proximate to the conveyor belt. Power sources 40 are operatively connected to sensors 42. Output from sensors 42 are directed to computer acquisition system 30. Maximum sensitivity sensors 42 are used in this embodiment. Particle 12 in a single package 48 is detected, and an appropriate signal reaches computer acquisition system 30. Computer acquisition system 30 then provides a signal to a user as to which package 48 includes particle 12 so that it can be removed from the line. Computer acquisition system 30 thus includes a software package, such as that commercially available under the trademark TESTPOINT™, that is customized to provide a color graphical output from data from the different sensors of the system, to provide for the storage of the data, and to provide appropriate control signals for the detection of food particles in the pipe 20 or in the package 48.

Figure 3:
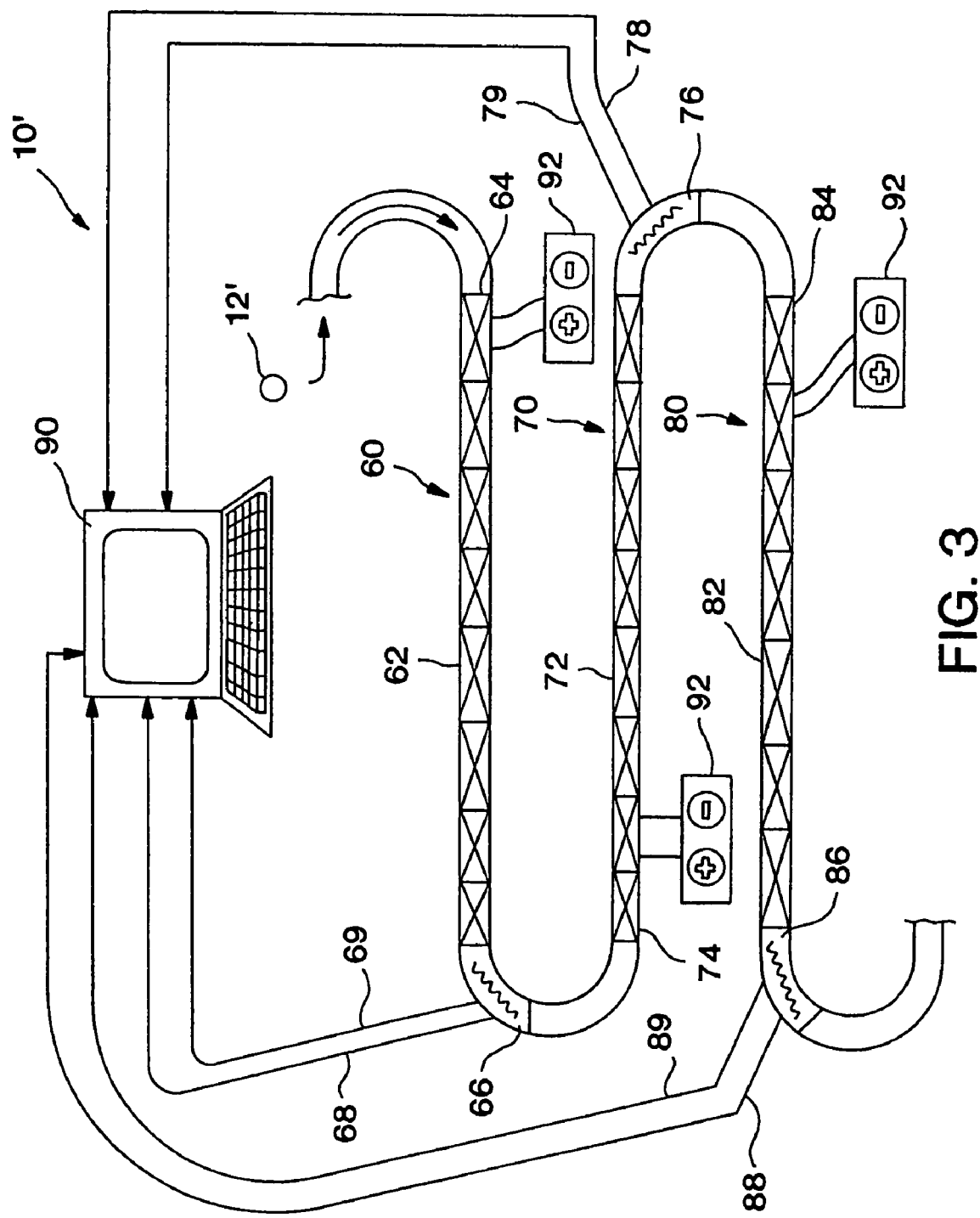
FIG. 3 is a schematic view of an alternative embodiment of the system of the present invention.

Referring now to FIG. 3, an alternative configuration of a system of the present invention is referred to generally as 10'. In system 10' a particle 12' is detected continuously over a pipe sections 60, 70 and 80 in a continuous thermal processing line by the placement of consecutive sensors 62, 72 and 82. That is, sensors 62, 72 and 82 are placed consecutively in a series of strings 64, 74 and 84. Power sources 92 are operatively connected to sensors 62, 72 and 82 and strings 64, 74 and 84. Preferably, the entire length and circumference of pipe section 60, 70 and 80 are covered by two or more strings 64, 74 and 84 (e.g. 2, 3, 4, 5, 6, 7, 8, 9 or 10 strings, or other number sufficient to completely cover a pipe section) comprising two or more sensors 62, 72 and 82 (e.g. 2, 3, 4, 5, 6, 7, 8, 9 or 10 sensors, or other number sufficient to completely cover a pipe section). The positioning of sensors 62, 72 and 82 and strings 64, 74 and 84 in this manner enhances the ability to detect a signal from a particle 12' that is indicative of the "cold spot" in the particle 12' reaching a predetermined temperature.

Continuing with FIG. 3, each string 64, 74 and 84 is operatively connected to amplifiers 66, 76 and 86, respectively, which subsequently feed into acquisition channels 68, 78 and 88, respectively. Acquisition channels 68, 78 and 88 are operatively connected to acquisition computer 90 and thus deliver signals from particles 12' to acquisition computer 90. Acquisition computer 90 thus represents a device for digital recording of output (e.g. signals from particles 12') for documentation storage, e.g. as computer data files, and subsequent retrieval and analysis purposes. Other such devices include digital cameras. Another representative such device includes a video camera, which can be employed for analog (video tape) recording for documentation storage and subsequent retrieval and analysis purposes. Such a camera can be operatively connected to system 10' for automated activation upon detection of a signal or other desired event. Another such device provides for video recording onto a VCR tape off the actual computer display signal, that is, without using a camera, but rather through a converter to a regular NTSC video. This converter can be built into a video card in acquistion computer 90 or can be external. This converter allows recording onto a tape of anything that is displayed on the computer screen—meaning that as different signals at different locations of particles flowing through system 10' are observed, they can be recorded on the video tape. This can be done, for example, with magnetic particles and the corresponding peaks that are shown in FIGS. 10–17 and described in the Examples presented below.

Continuing with FIG. 3, the signal that is collected and amplified by amplifier 66, 76 and 86 is the summation of signals from sensors 62, 72 and 82 in strings 64, 74 and 84. Thus, all signals from sensors 62, 72 and 82 have effectively received two separate amplifications prior to acquisition by computer 90. Acquisition channels 69, 79 and 89 are operatively connected to sensors, lines and amplifiers on the opposite faces (not shown in FIG. 3) of pipe sections 60, 70 and 80, and thus also deliver collected and amplified signals from particles 12' to acquisition computer 90. Thus, preferably, two or more sensor strings, each comprising one or more sensors (e.g. 2, 3, 4, 5, 6, 7, 8, 9, 10, etc., or other number sufficient to completely cover a pipe section) are used on each pipe section. From each sensor string signals are acquired by a respective acquisition channel (68, 69, 78, 79, 88, 89).

In the configuration in a system 10' of the present invention as presented in FIG. 3, it is preferred that the timing of insertion of particles 12' into system 10' is such that only a single particle 12' is traveling along a pipe section 60, 70 and/or 80 at a single instance. This provides for better resolution of when a temperature switch occurs along pipe sections 60, 70 and/or 80 and of when particle 12' enter and exits a respective pipe section. The configuring of sensors 62, 72 and 82 in strings 64, 74 and 84 all around pipe sections 60, 70 and/or 80 also puts more sensors proximate to the flow of material in pipe sections 60, 70 and/or 80. Thus, added components for detection of signal from a temperature switch in a particle 12' are provided. Moreover, the provision of two separate amplifications, as well as the provision of multiple additional acquisition channels, adds to the reliability and robust character of signal detection already provided in accordance with the present invention.

Figure 4:
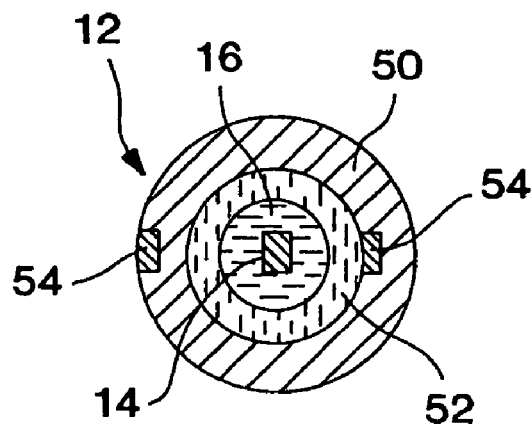
FIG. 4 is a vertical cross-sectional view of a spherical particle of the present invention.
Figure 5:
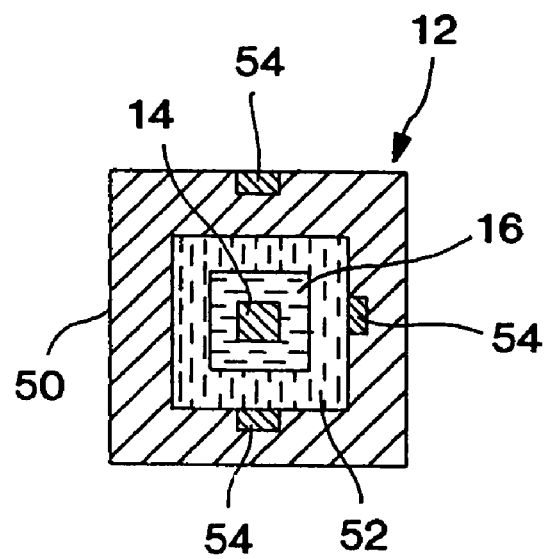
FIG. 5 is a vertical cross-sectional view of a cubical particle of the present invention.

Referring now to FIGS. 4–7, representative particles 12 of the present invention are described in more detail. Referring particularly to FIGS. 4 and 5, particle 12 comprises an implant 14 surrounded by a shield material 16. Shield material 16 is designated by horizontal dashed lines. As described hereinabove, implant 14 can be a magnetic implant, a luminescent implant, or other suitable implant that emits a signal that can be detected in accordance with the method and system of the present invention. Shield material 16 can comprise a ferromagnetic material or an opaque material as discussed in detail hereinabove. Shield material 16 is thus characterized by the loss of its shielding ability when the interior of particle 12 reaches a predetermined temperature in a thermal process. For example, in the case of a continuous thermal process for the aseptic processing of food, shield materials 16 can be incorporated wherein they lose their ability to shield implant 14 at temperatures of 135° C., 140° C., and 145° C. However, the lowest temperature at which shield material 16 loses its shielding ability is preferably a conservative temperature as defined herein.

Continuing with reference to FIGS. 4 and 5, optionally, particles 12 further comprise a carrier 50 that is depicted as a hollow container. Carrier 50, which is designated with diagonal hatching in FIGS. 4 and 5, comprises a material that is susceptible to precision manufacturing through machining and insertion molding. It is also preferable that carrier 50 be stable at ultra high temperatures. Additionally, carrier 50 can be reusable so as to be amenable to multiple applications. Suitable examples of material for carrier 50 include polypropylene, polypropylene co-polymer, polysaccharide gels, alginate gels, protein gels, polysulfone, nylon, polytetrafluoroethylene sold under the registered trademark TEFLON® by E.I. du Pont De Nemours and Company of Wilmington, Del., other suitable polymers, or combinations thereof. The preferred density of the material is approximately 0.9 to 1.1 g/mL.

Continuing with reference to FIGS. 4 and 5, particle 12 can also comprise an inoculum pack 52 of a suitable microorganism and its spores. Inoculum pack 52 is designated by vertical spaced dashes in FIGS. 3 and 4. When particle 12 comprises an inoculum pack 52, the thermal conductivity of particle 12 must be lower than that of an actual food particle so as to provide a conservative characterization of the amount of heat received by the inoculum pack 52 when it run through the stream. In the case where particle 12 is run through a thermal processing system for a particulate-containing food material, inoculum pack 52 can be used to further determine the effectiveness of the system in killing microorganisms and to determine if particle 12 stayed in the system for a sufficient length of time at a sufficient temperature to kill the microorganisms and their spores. Thus, the versatility of particle 12 in evaluating thermal treatment of a stream of a particulate-containing food product can be enhanced through the inclusion of an inoculum pack 52. The inoculum pack 52 can be cultured using well-known techniques, such as plating on a suitable cultural medium, to see if microorganisms or their spores are present in sufficient numbers to grow when cultured.

Continuing with reference to FIGS. 4 and 5, particle 12 can further comprise a time-temperature integrating device (TTID) 54, such as a thermal memory cell. Suitable examples of TTID 54 include the thermal memory cells described in U.S. Pat. Nos. 5,159,564 and 5,021,981, the contents of each of which are herein incorporated by reference, as well as time/temperature integrator cells. TTIDs 54 are designated by rectangles with diagonal hatching in FIGS. 4 and 5. TTIDs 54 are used to further characterize the time-temperature profile of a thermal processing system. This provides additional information to a user to determine if particles 12 were exposed to an appropriate temperature for an appropriate length of time as they pass through the system. Thus, the inclusion of TTID 54 in particles 12 adds to the versatility of the present invention in evaluating thermal treatment of a stream of a particulate-containing food product, or other material.

Particle 12 can further comprise an inert material for density compensation in accordance with techniques disclosed in U.S. Pat. Nos. 5,932,813 and 6,015,231, both to Swartzel et al., and each of which herein incorporated by reference in its entirety. Suitable examples of inert components include polypropylene beads, silica gel beads, non-magnetic stainless steel beads, a thermal insulating material, and combinations thereof. Examples of suitable thermal insulating materials include polyurethane foam, among others. The use of a thermal insulating material provides for a particle 12 with a thermal conductivity lower than that of an actual food particle so as to provide a conservative characterization of an amount received by the implant 14, shield material 16, inoculum pack 52, and thermal cells 54 when they are run through a stream in particle 12. Thus, other suitable examples of thermal insulating materials include polymers and polymer gels. Particle 12 can also comprise an actual food product or can comprise a transponder such as one described in U.S. Pat. No. 5,261,282, issued to Grabowski et al. on Nov. 16, 1993, the contents of which are herein incorporated by reference. Particle 12 can also comprise a thermal pill, as described in NASA Tech Briefs, June 1990, page 106.

Referring now to FIGS. 4–7 collectively, particles 12 are formed in a variety of shapes, including cubical, rectangular or box shaped, spherical, and cylindrical. Indeed, the shapes can be chosen to simulate food particle shapes either nearly exactly or conservatively. In this case, each particle 12 is also dimensioned according to actual food particle size specifications in order to facilitate conservative simulation of an actual food particle's behavior in a thermal stream.

Figure 6:
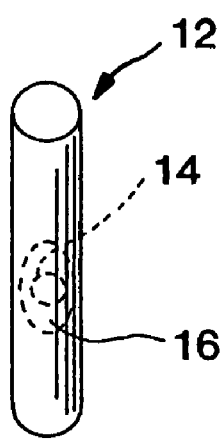
FIG. 6 is a perspective view of a cylindrical particle of the present invention.
Figure 7:
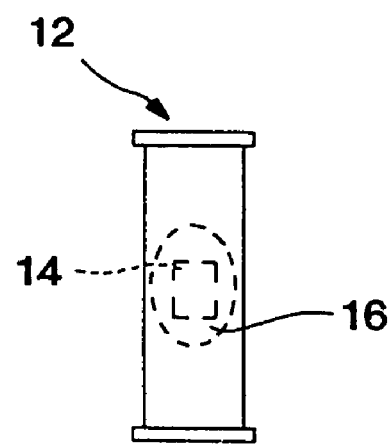
FIG. 7 is a front elevation view of a rectangular particle of the present invention.

Referring particularly to FIGS. 6 and 7, alternative embodiments of particle 12 are described. In FIG. 6, particle 12 comprises a hollow cylinder, preferably comprising polypropylene or polystyrene. The cylinder can be of varying diameter, including ¼ inch, ⅛ inch and 1/16 inch. The appropriate length and diameter of the cylinder are chosen according to actual food particle size specifications in order to facilitate conservative simulation of an actual food particle's behavior in a thermal stream. Implant 14 and shield material 16 are mounted within the hollow particle 12 and as such, are shown in phantom in FIG. 6. As best seen in FIG. 7, implant 14 and shield material 16 are placed into particle 12 and the ends of particle 12 are sealed. Thus, implant 14 and shield material 16 are also shown in phantom in FIG. 7. Finally, while the foregoing examples of particle 12 can comprise polypropylene or polystyrene, it is also noted that particle 12 can comprise an actual food particle.

Figure 8:
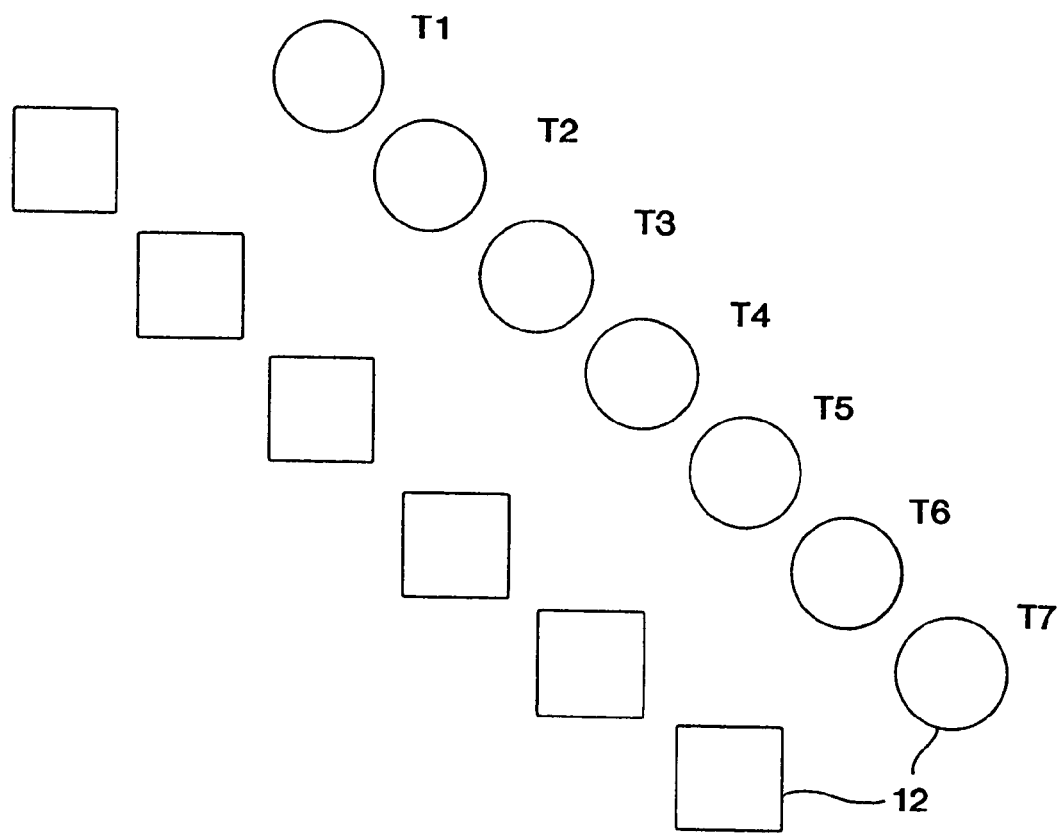
FIG. 8 is a top plan view of seven sets of individually calibrated single-temperature switch particle implants having temperatures T1–T7 used to generate the graph presented in FIG. 9.
Figure 9:
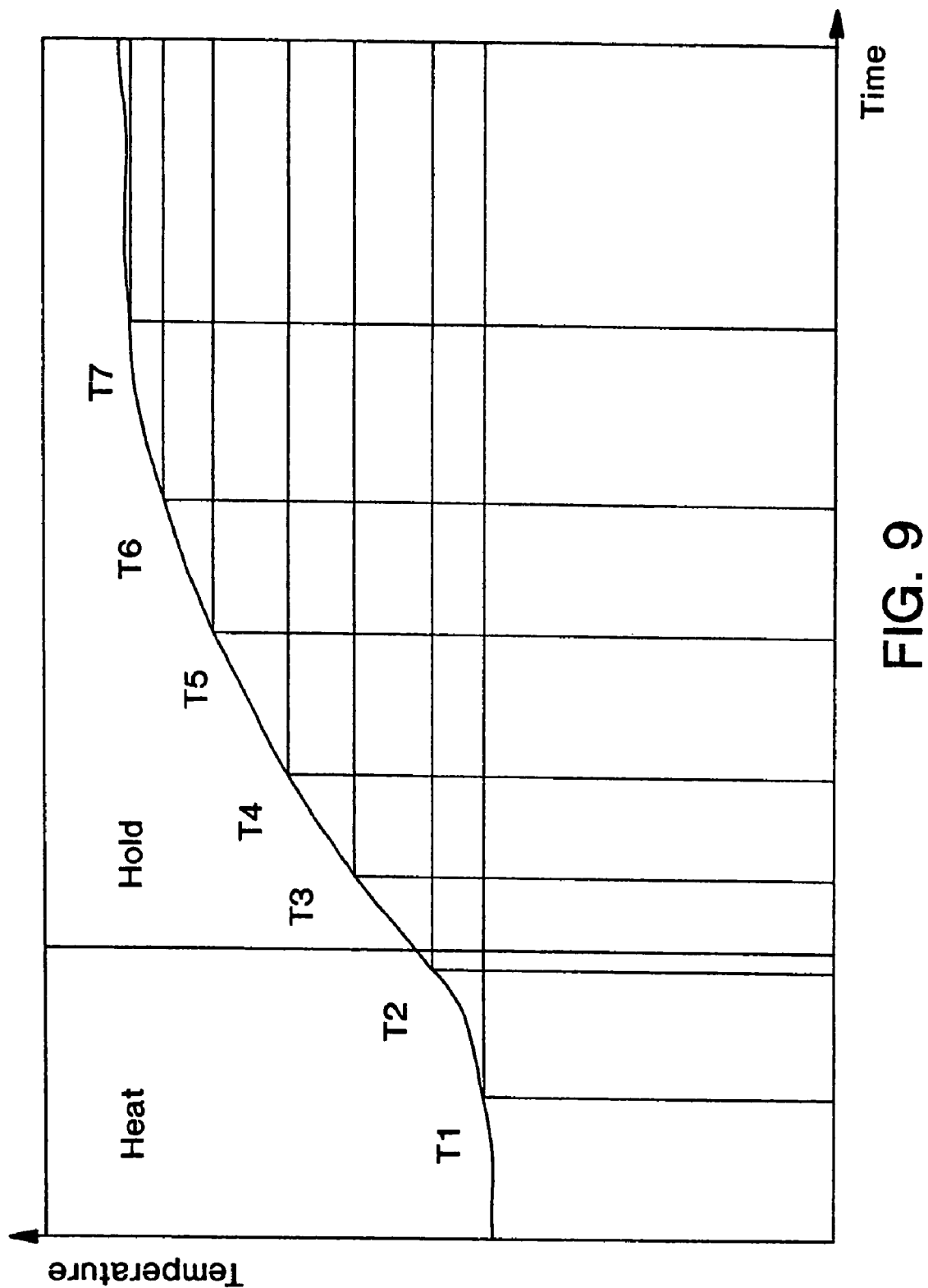
FIG. 9 is a graph depicting a time and temperature profile for the particles depicted in FIG. 8 as employed in a simulated aseptic process using a system of the present invention.
Figure 10:
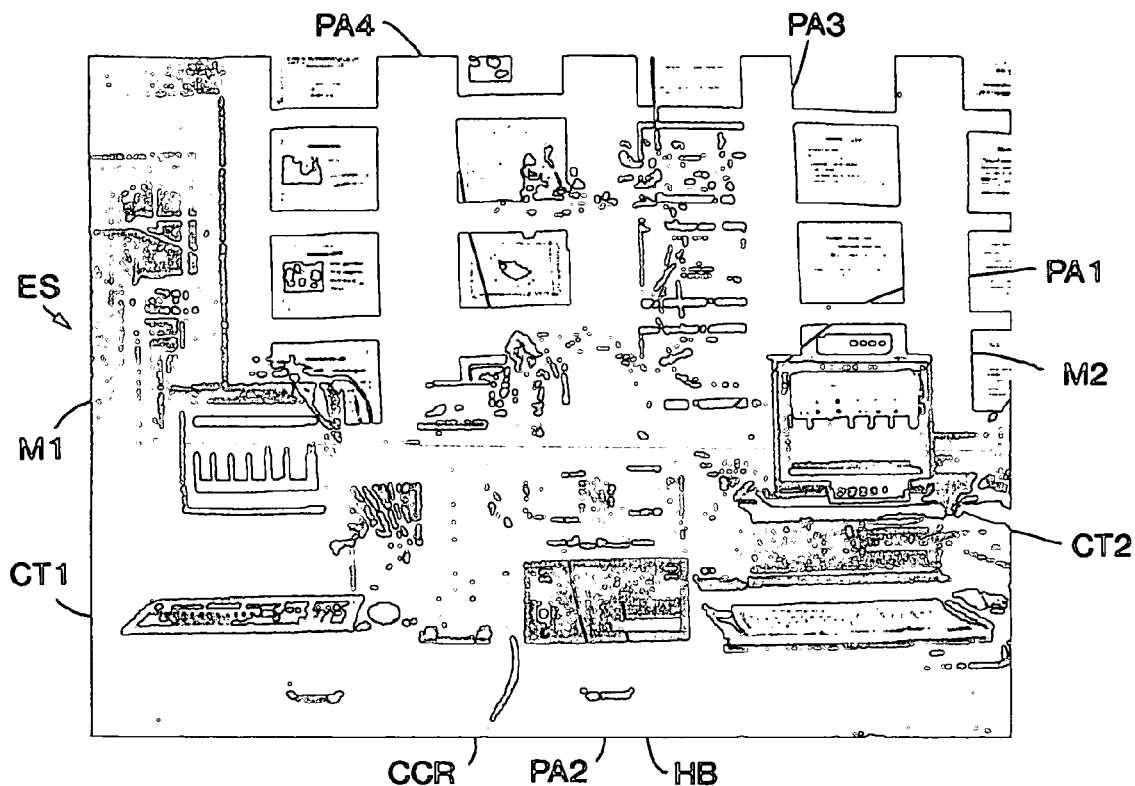
FIG. 10 is a front view depicting an experimental embodiment of a system of the present invention.
Figure 11:
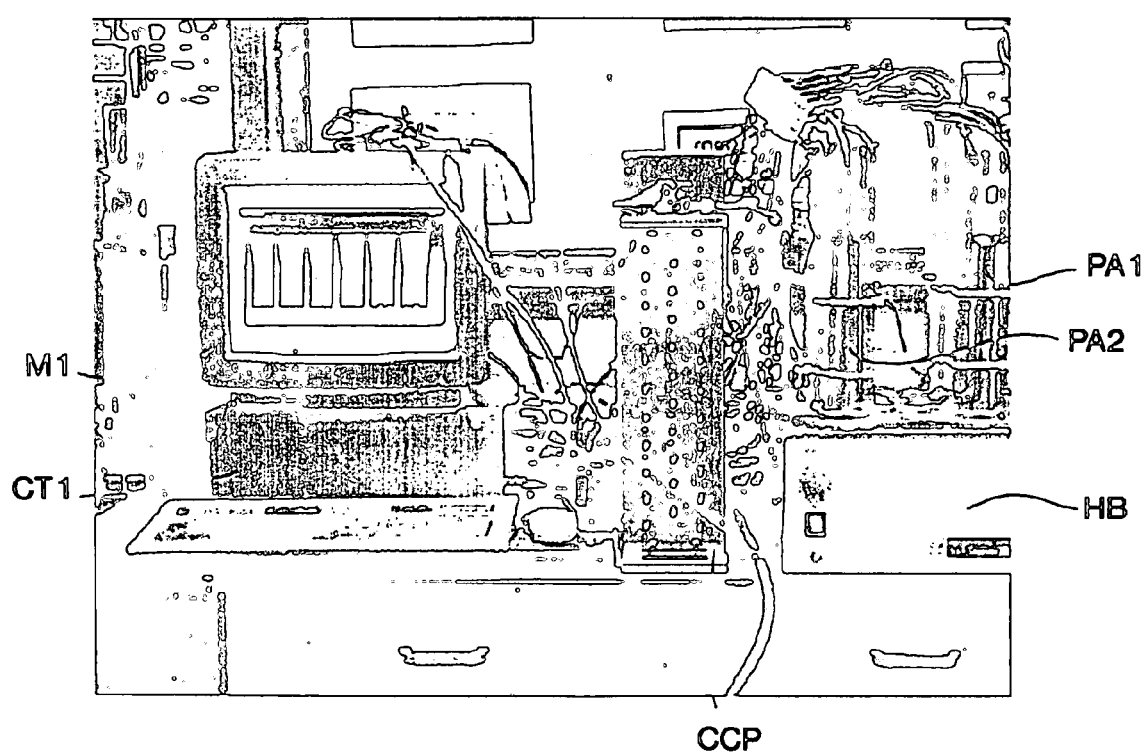
FIG. 11 is an enlarged view of a computer terminal, monitor, heat block and pipe assemblies of an experimental embodiment of a system of the present invention.
Figure 12:
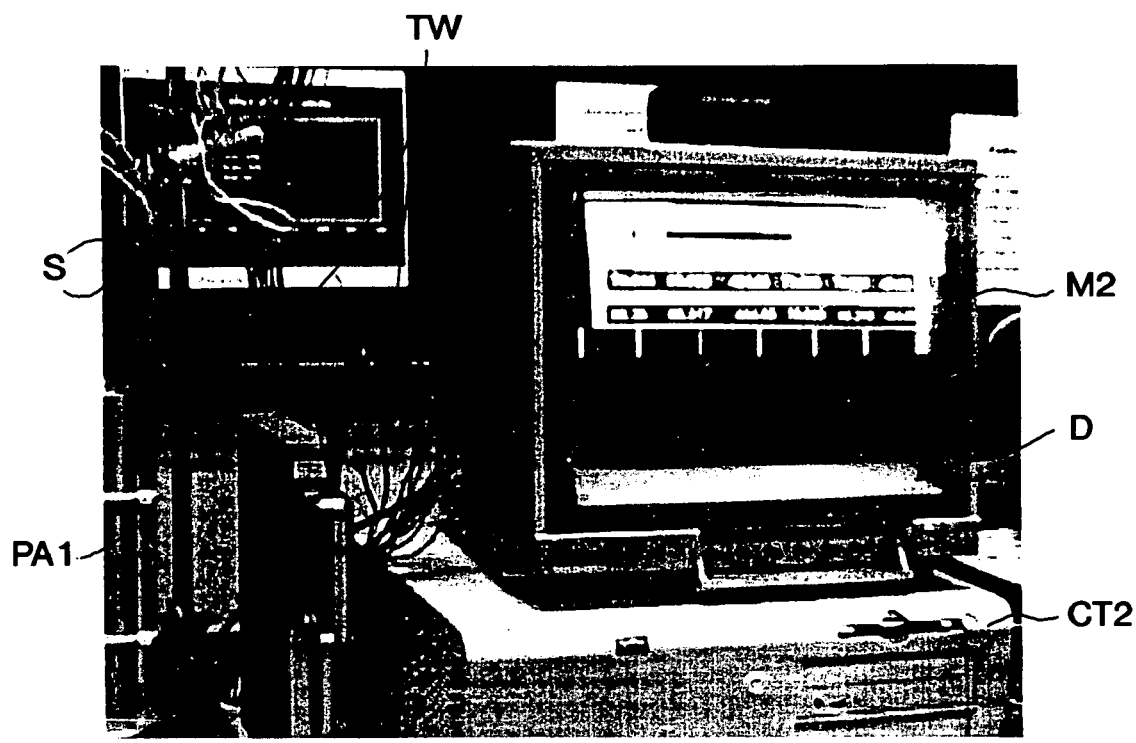
FIG. 12 is an enlarged view of a computer terminal, monitor, display, sensors, pipe assemblies, heat block and thermocouple wires of an experimental embodiment of a system of the present invention.
Figure 13:
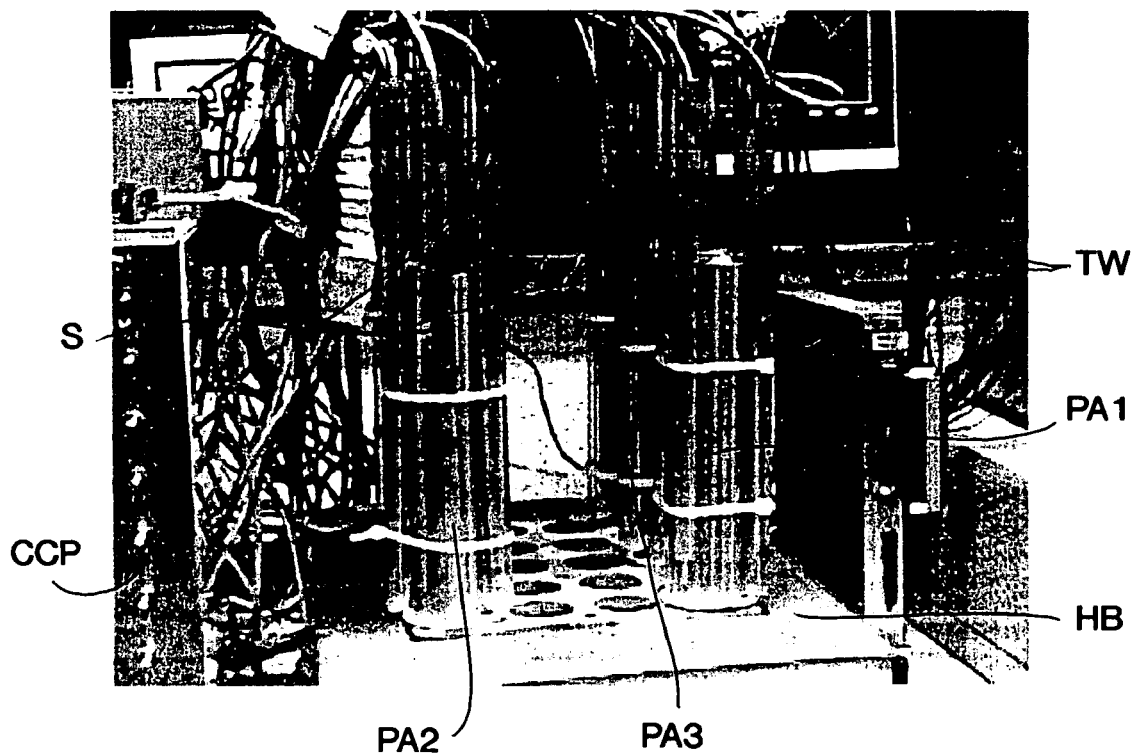
FIG. 13 is an enlarged view of a channel control panel, heat block, pipe assemblies and sensors of an experimental embodiment of a system of the present invention.
Figure 14:
FIG. 14 is an enlarged view of sensors, pipe assemblies and thermocouple wires of an experimental embodiment of a system of the present invention.

Referring now to FIGS. 8 and 9, a time-temperature history for simulated aseptic processing in a continuous system is represented graphically. This graphical representation is generated through the use of individually calibrated single temperature switch particle implants as described hereinabove, wherein the switch particle implants can have any desired, and preferably different, temperatures. In FIG. 8, sets of particles 12 having switch temperatures T1 through T7 are depicted. Particles 12 are passed through a continuous thermal treatment system as described herein, and each particle is detected at the switch temperature. The switch temperatures are then plotted to form a line graph as represented by points T1, T2, T3, T4, T5, T6, and T7 in FIG. 9. From the data associated with and/or generated by the detection of these particles a conservative thermal process estimate of the overall thermal treatment can be generated as that represented by the area under one or more rectangular curves defined by points T1–T7, in that the temperature switch points represent "cold spots" in the respective particles. In this case areas under the curves are only counted once (no multiple credit for overlapping surfaces). Thus, other particles, e.g. food particles, traveling in the flow of material will have received at least the same heat treatment as indicated by this conservative thermal process estimate. Such data can be stored for documentation, retrieval, analysis or combinations thereof.

Continuous flow thermal processing equipment comprises heating, holding, and cooling sections, as discussed in U.S. Pat. No. 4,808,425 to Swartzel et al., herein incorporated by reference in its entirety. The thermal treatment received by the product in the heating and cooling stage, is oftentimes not considered in evaluating thermal process estimate; instead, only the holding time ($t_H$) and holding temperature ($T_H$) are considered. However, when products are treated in such equipment at higher temperatures and shorter times, the contribution of the heating stage, and perhaps the cooling stage, to the total thermal treatment of the product becomes significant, and must be accounted for if a product with good functional qualities is to be obtained. In accordance with the present invention, as described in FIGS. 8 and 9 and elsewhere herein, calibrated single temperature switch particle implants can be used to accumulate the conservative thermal process estimate over the heating and holding portions of a continuous thermal treatment apparatus. When the desired thermal process estimate is observed the product can be diverted to a cooling section, thus avoiding additional time and material flowing through holding sections. The present invention thus provides for an improvement over currently available technologies for conservative evaluation of thermal process treatment, including but not limited to aseptic processing.

III. EXAMPLES

The following Examples have been included to illustrate preferred modes of the invention. Certain aspects of the following Examples are described in terms of techniques and procedures found or contemplated by the present inventors to work well in the practice of the invention. These Examples are exemplified through the use of standard laboratory practices of the inventors. In light of the present disclosure and the general level of skill in the art, those of skill will appreciate that the following Examples are intended to be exemplary only and that numerous changes, modifications and alterations can be employed without departing from the spirit and scope of the invention.

Referring now to FIGS. 10–14, an experimental system ES for use in demonstrating the present invention is depicted. Experimental system ES includes computer terminals CT1 and CT2, each of which include a monitor M1 and M2, and a channel control panel CCP, respectively. Experimental system ES also includes four pipe assemblies PA1–PA4 in thermal communication with heating block HB. Pipe assemblies P1–P4 include a thermo-conductive oil, which represents a batch or continuous stream of material.

Particles (not shown in FIGS. 10–14) are operatively connected to computer terminal CT2 via thermocouple wires TW. The particles are mounted for vertical movement past sensors S mounted on the exterior of pipe assemblies P1–P4 to simulate movement of the particles by sensors in a continuous stream. The coupling of the particles to computer terminal CT2 using thermocouple wires TW facilitates the calibration of the temperature of the particles where a signal change is observed, i.e. the predetermined temperature. Of course, particles used in a non-experimental embodiment of the present invention are not coupled in this manner. The particles used in Examples 1 and 2 comprise magnetic implants and ferromagnetic shield material as described hereinabove.

Figure 15:
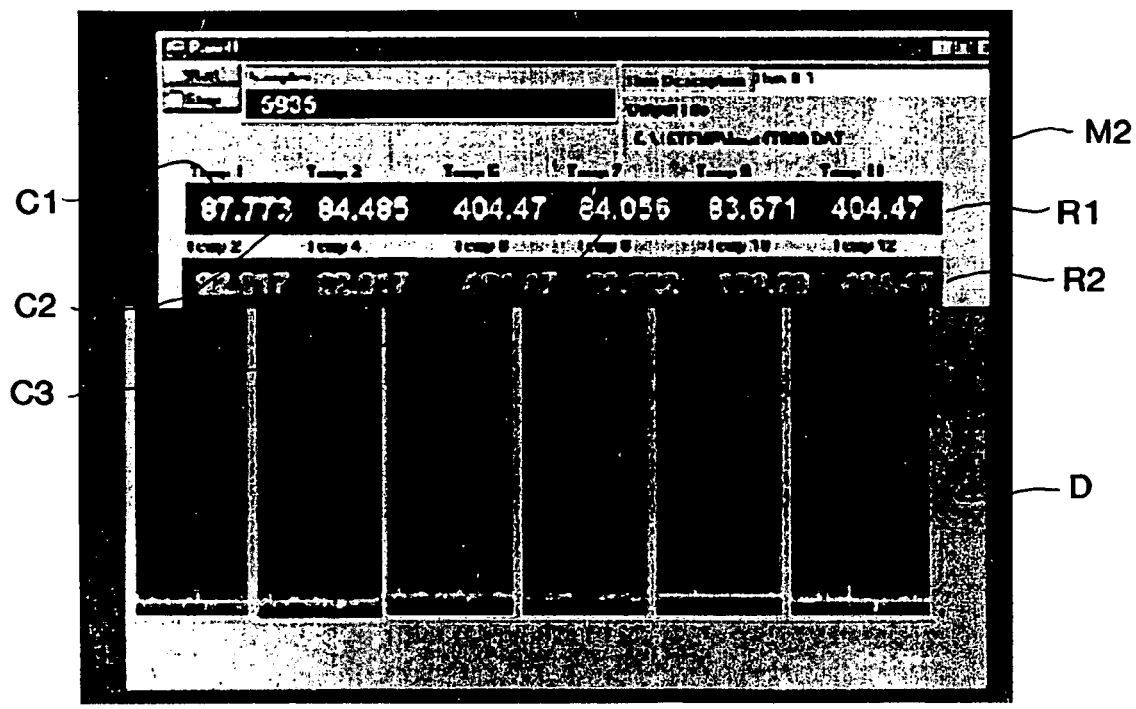
FIG. 15 is a computer monitor screen shot depicting the detection capabilities of the method and system of the present invention as described in Example 1.

Referring now to FIG. 15, Example 1 pertaining to the present invention is depicted as a still image of monitor M2 of experimental system ES. In FIG. 15, channels C1, C2 and C3 of graphical display D are active. The upper row R1 of data points reflect measured temperatures for a series of particles used in pipe assemblies P1–P4. The lower row of data points R2 reflects the temperatures of the hot oil in pipe assemblies P1–P4. None of the calibration temperatures (i.e. predetermined temperatures) for the particles have been exceeded and thus, in the graphical display D, no demarcations representing the detection of an uncloaked or unshielded signal from one of the particles are indicated.

Figure 16:
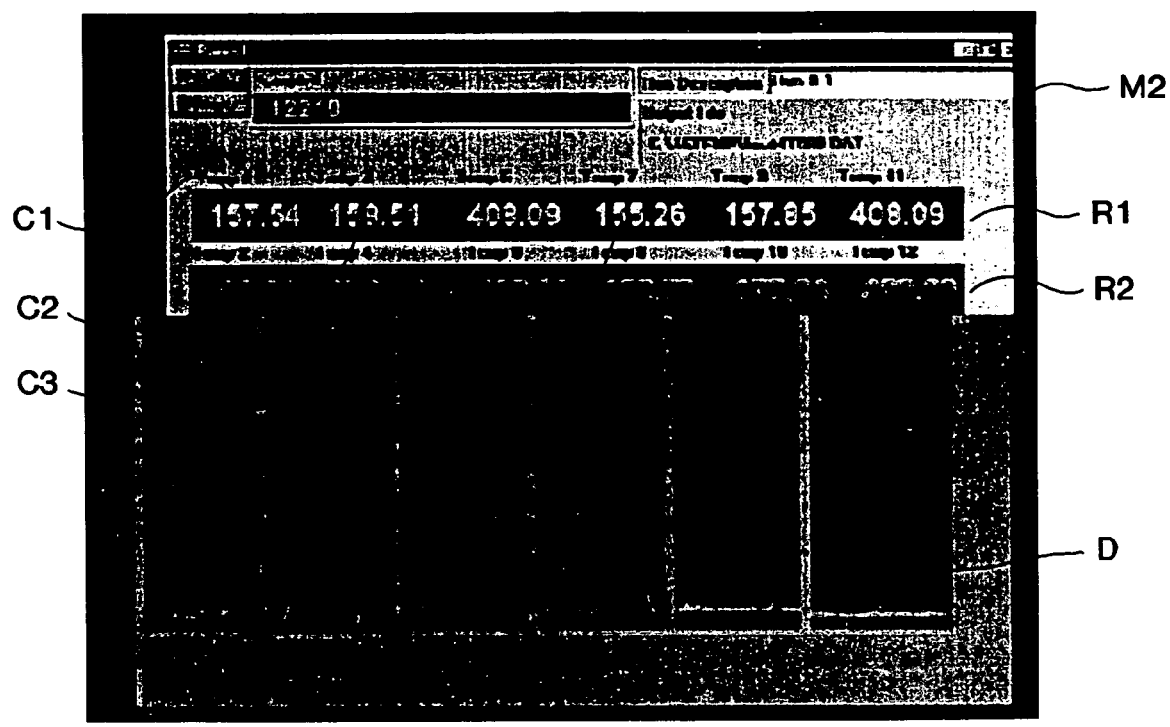
FIG. 16 is a computer monitor screen shot depicting the detection capabilities of the method and system of the present invention as described in Example 2.

Referring now to FIG. 16, Example 2 pertaining to the present invention is depicted as a still image of monitor M2 of experimental system ES. In FIG. 16, channels C1, C2 and C3 of graphical display D are active. Monitor M2 displays an upper row R1 of data points, which reflect the measured temperatures of a series of particles exceeding the calibration temperatures (i.e., predetermined temperatures) of the series of particles after exposing the particles to the hot oil in pipe assemblies P1–P4. The lower row of data points R2 reflects the temperatures of the hot oil in pipe assemblies P1–P4. As observed in FIG. 16, the predetermined or calibration temperature for the respective particles has been exceeded in the particles monitored by channels C1, C2 and C3, and demarcations in graphical display D demonstrate the detection of the uncloaked or unshielded implant in each particle by the sensors S affixed to the surface of one of pipe assemblies P1–P4. Therefore, the range and versatility of the method and system of the present invention are depicted in Examples 1 and 2 wherein the production, calibration and evaluation of a collection of particles having varying pre-determined temperatures are depicted.

In summary, the detection and recordation of temperature measures in accordance with the present invention represents the first disclosure of the use of implants that are switched from a cloaked to an uncloaked signal for thermometric or combined thermometric and residence time measurement purposes. The detection and recordation of temperature measures in accordance with the present invention also represents the first disclosure of the use of such implants or particles in conjunction with detection along multiple points while moving in a continuous stream and using more than a single detection location, sensor or point.

The detection and recordation of temperature measures in accordance with the present invention also represents the first disclosure of the use of conservative temperature measurement in thermal process evaluation, validation and monitoring. Finally, the detection and recordation of temperature measures in accordance with the present invention also represents the first disclosure of a non-contact, non-obstructing temperature measurement procedure that is functional through the stainless steel walls of existing process equipment and that provides monitoring and detection for an entire observed length of a monitored processing system.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method of generating a conservative time-temperature measurement for a batch or a continuous stream of material, the method comprising:
    (a) providing a particle comprising an implant surrounded by a shield material that emits a first signal at temperatures below a pre-determined temperature and emits a second signal at temperatures above the pre-determined temperature, wherein the pre-determined temperature comprises a temperature at which the shield material no longer shields the implant;
    (b) inserting the particle provided in step (a) into the batch or continuous stream; and
    (c) measuring the time spent by the particle above the pre-determined temperature by detecting the second signal continuously in a process stage to thereby generate a conservative time-temperature measurement for the batch or continuous stream.

2. The method of claim 1, wherein the particle has a density, and the density of the particle is adjusted to a pre-determined target density.

3. The method of claim 2, wherein the target density is that density with the highest likelihood of including a fastest particle.

4. The method of claim 1, wherein the particle further comprises a wall thickness, size, shape, composition or combination thereof that imparts a conservative heat transfer characteristic to the particle.

5. The method of claim 1, wherein the first and second signals are detected via a sensor placed proximate to the batch or stream.

6. The method of claim 5, wherein the first and second signals are detected via a plurality of sensors placed proximate to the batch or continuous stream.

7. The method of claim 1, further comprising measuring a length of continuous stream through which the second signal is maintained.

8. The method of claim 7, wherein the second signal is detected via a plurality of successive, parallel or overlapping sensors placed proximate to the continuous stream over the length of the continuous stream.

9. The method of claim 1, wherein the continuous stream is a particulate-containing food product passing through a thermal processing apparatus.

10. The method of claim 9, wherein the particle further comprises a component selected from the group consisting of a time-temperature integrating device (TTID), a microbial load, and combinations thereof.

11. The method of claim 1, further comprising recording data associated with the detecting of the first and second signals.

12. The method of claim 11, wherein the data is stored for documentation, retrieval, analysis or combinations thereof.

13. The method of claim 12, further comprising retrieving the data, analyzing the data, or combinations thereof.

14. The method of claim 1, wherein the particle further comprises a magnetic implant surrounded by a ferromagnetic shield material and the predetermined temperature further comprises a Curie temperature for the ferromagnetic shield material.

15. The method of claim 14, wherein the magnetic implant comprises a material selected from the group consisting of neodymium iron boron, cobalt rare earth, aluminum-nickel, ceramic, organic, plastic-embedded metal, or ceramic and combinations thereof.

16. The method of claim 14 wherein the particle further comprises a luminescent implant surrounded by an opaque material and the predetermined temperature further comprises a melting temperature of the opaque material.

17. A method of generating a conservative time-temperature measurement for a batch or a continuous stream of material, the method comprising:
    (a) providing a plurality of particles comprising an implant surrounded by a shield material, each particle emitting a first signal at temperatures below a different pre-determined temperature and emitting a second signal at temperatures above the different pre-determined temperature, wherein the pre-determined temperature comprises a temperature at which the shield material no longer shields the implant;
    (b) inserting the particles provided in step (a) into the batch or continuous stream; and
    (c) measuring the time spent by the particles above the pre-determined temperature by detecting the second signal continuously in a process stage to thereby generate a conservative time-temperature measurement for the batch or continuous stream.

18. The method of claim 17, wherein the particle has a density, and the density of the particle is adjusted to a pre-determined target density.

19. The method of claim 18, wherein the target density is that density with the highest likelihood of including a fastest particle.

20. The method of claim 17, wherein the particle further comprises a wall thickness, size, shape, composition or combination thereof that imparts a conservative heat transfer characteristic to the particle.

21. The method of claim 17, wherein the first and second signals are detected via a sensor placed proximate to the batch or continuous stream.

22. The method of claim 21, wherein the first and second signals are detected via a plurality of sensors placed proximate to the batch or continuous stream.

23. The method of claim 22, further comprising calibrating a sensor to detect a signal from a particle at a temperature below the predetermined temperature.

24. The method of claim 17, further comprising measuring a length of continuous stream through which the second signal is maintained.

25. The method of claim 24, wherein the second signal is detected via a plurality of successive, parallel or overlapping sensors placed proximate to the continuous stream over the length of the continuous stream.

26. The method of claim 25, further comprising calibrating a sensor to detect a signal from a particle at a temperature below the predetermined temperature.

27. The method of claim 17, wherein the predetermined temperature comprises a conservative temperature.

28. The method of claim 17, wherein the continuous stream is a particulate-containing food product passing through a thermal processing apparatus.

29. The method of claim 28, wherein the particle further comprising a component selected from the group consisting of a time-temperature integrating device (TTID), a microbial load, and combinations thereof.

30. The method of claim 17, further comprising recording data associated with detecting of the first and second signals.

31. The method of claim 30, wherein the data is stored for documentation, retrieval, analysis or combinations thereof.

32. The method of claim 31, further comprising retrieving the data, analyzing the data, or combinations thereof.

33. The method of claim 17, wherein the particle further comprises a magnetic implant surrounded by a ferromagnetic shield material and the predetermined temperature further comprises a Curie temperature for the ferromagnetic shield material.

34. The method of claim 33, wherein the magnetic implant comprises a material selected from the group consisting of neodymium iron boron, cobalt rare earth, aluminum-nickel, ceramic, organic, plastic-embedded metal, or ceramic and combinations thereof.

35. The method of claim 33, wherein the particle further comprises a luminescent implant surrounded by an opaque material and the predetermined temperature further comprises a melting temperature of the opaque material.

* * * * *